United States Patent
Nakamura et al.

(10) Patent No.: US 8,819,581 B2
(45) Date of Patent: Aug. 26, 2014

(54) INFORMATION PROCESSING DEVICE AND IMAGE PROCESSING DEVICE

(75) Inventors: Fumitake Nakamura, Kobe (JP); Noriyuki Kamikawa, Kobe (JP); Takahiro Nakagawa, Kobe (JP); Satoru Nagamoto, Kobe (JP); Takashi Ohta, Kobe (JP); Takaho Okada, Kobe (JP); Hideki Kawaguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 87 days.

(21) Appl. No.: 13/063,339

(22) PCT Filed: Sep. 11, 2009

(86) PCT No.: PCT/JP2009/065960
§ 371 (c)(1),
(2), (4) Date: Mar. 10, 2011

(87) PCT Pub. No.: WO2010/030010
PCT Pub. Date: Mar. 18, 2010

(65) Prior Publication Data
US 2011/0164062 A1 Jul. 7, 2011

(30) Foreign Application Priority Data

Sep. 12, 2008 (JP) ............... 2008-234527
Sep. 12, 2008 (JP) ............... 2008-234598
Sep. 12, 2008 (JP) ............... 2008-235298

(51) Int. Cl.
*G06F 3/048* (2013.01)
*G06F 3/01* (2006.01)
*G06F 3/0488* (2013.01)

(52) U.S. Cl.
CPC .............. *G06F 3/016* (2013.01); *G06F 3/0488* (2013.01)
USPC ............... 715/788; 715/702; 715/800; 701/1; 701/400; 701/538

(58) Field of Classification Search
CPC .............................. G06F 3/016; G06F 3/0488
USPC ................. 715/781, 788, 790, 791, 792, 800; 701/400, 485, 538
See application file for complete search history.

(56) References Cited

U.S. PATENT DOCUMENTS 6,415,224 B1 * 7/2002 Wako et al. ............... 701/409
2005/0270311 A1 * 12/2005 Rasmussen et al. ....... 345/677
(Continued)

FOREIGN PATENT DOCUMENTS

DE  10 2005 057 096 A1   6/2006
DE  10 2007 016 057 A1   11/2007
(Continued)

OTHER PUBLICATIONS
Medler et al, "WO2007121831.pdf", published Nov. 1, 2007, 7 pages.*
(Continued)

*Primary Examiner* — Haoshian Shih
(74) *Attorney, Agent, or Firm* — Oliff PLC

(57) ABSTRACT

An information processing device capable of processing navigation information is provided. A touch panel can display images and can receive a user's touch operation. An image generation section generates a navigation image including a map image and a plurality of operation button images for receiving the touch operation, the images being displayed on the touch panel. A plurality of operation button images include a first operation button image related to a navigation function and a second operation button image related to a plurality of functions other than the navigation function. The image generation section generates a first image which is obtained by combining the navigation image and the first operation button image and a second image which includes the second operation button. The first image and the second image are respectively displayed in a first display region and a second display region. The first display region and the second display region are separated by a movable boundary.

19 Claims, 25 Drawing Sheets

(56) References Cited

U.S. PATENT DOCUMENTS

| | | | |
|---|---|---|---|
| 2006/0036959 A1* | 2/2006 | Heatherly et al. | 715/764 |
| 2006/0122769 A1 | 6/2006 | Hotehama | |
| 2007/0083827 A1* | 4/2007 | Scott et al. | 715/811 |
| 2008/0016443 A1 | 1/2008 | Hiroshima et al. | |
| 2009/0024956 A1* | 1/2009 | Kobayashi | 715/784 |
| 2010/0287494 A1* | 11/2010 | Ording | 715/790 |

FOREIGN PATENT DOCUMENTS

| | | |
|---|---|---|
| JP | A-11-304504 | 11/1999 |
| JP | A-2001-174271 | 6/2001 |
| JP | A-2002-215278 | 7/2002 |
| JP | A-2002-340600 | 11/2002 |
| JP | A-2004-78888 | 3/2004 |
| JP | A-2004-355055 | 12/2004 |
| JP | A-2005-024918 | 1/2005 |
| JP | A-2006-053018 | 2/2006 |
| JP | A-2006-078360 | 3/2006 |
| JP | A-2007-102442 | 4/2007 |
| JP | A-2008-211559 | 9/2008 |

OTHER PUBLICATIONS

Chinese Office Action issued in Application No. 200910203210.X; Dated Aug. 24, 2011 (With Translation).

Apr. 19, 2011 International Preliminary Report on Patentability issued in International Application No. PCT/JP2009/065960.

Feb. 3, 2012 Extended Search Report issued in European Application No. 09813156.8.

Jun. 4, 2012 Notification of the Second Office Action issued in Chinese Patent Application No. 200910203210.X (with translation).

International Search report issued in Application No. PCT/JP2009/065960; Dated Dec. 28, 2009 (With Translation).

Oct. 16, 2012 Japanese Office Action issued in Japanese Patent Application No. 2008-234527 (with translation).

Oct. 16, 2012 Japanese Office Action issued in Japanese Patent Application No. 2008-234598 (with translation).

Oct. 16, 2012 Japanese Office Action issued in Japanese Patent Application No. 2008-235298 (with translation).

* cited by examiner

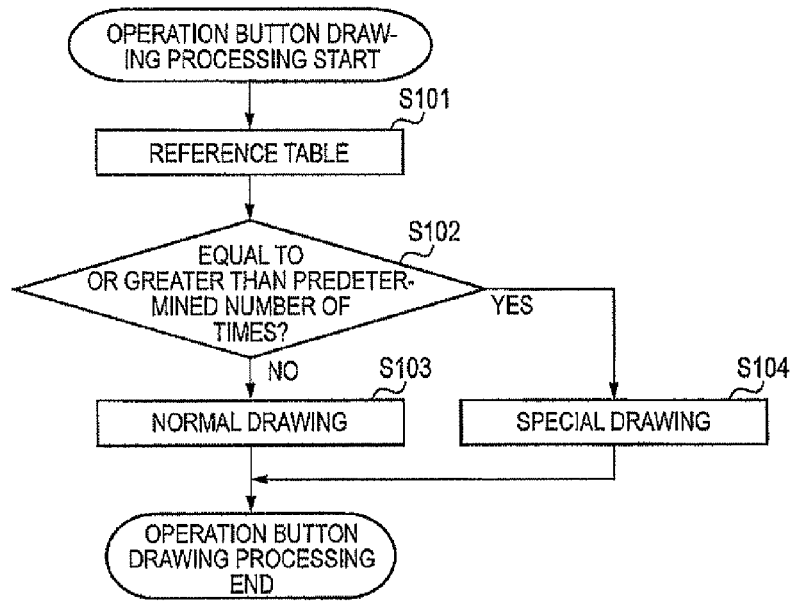

INFORMATION PROCESSING DEVICE AND IMAGE PROCESSING DEVICE

TECHNICAL FIELD

The present invention relates to an information processing device and an image processing device.

BACKGROUND ART

In recent years, with the advancement of information techniques, an electronic apparatus using screen display, such as a navigation device, has been rapidly developed. For example, PTL 1 describes a navigation device which displays only necessary information to facilitate understanding of a map. For example, PTL 2 describes a technique in which a menu screen is displayed such that a map image for navigation is pushed out, making it easy to recognize the correspondence relation before and after display of the menu screen.

CITATION LIST

Patent Literature

[PTL 1] JP-A No. 11-304504
[PTL 2] JP-A No. 2002-340600

SUMMARY OF INVENTION

Technical Problem

In order to reduce the increasing burden of a user's operation in a high-functional electronic apparatus, there is a GUI (Graphical User Interface) using a touch panel. However, in the environment in which the installment space of an electronic apparatus is limited, it is difficult to secure a sufficiently large display screen of the touch panel. For this reason, it is difficult to appropriately display necessary information while displaying operation buttons related to various functions in the electronic apparatus such that the user can operate the buttons without making a mistake. There is a case where various images may be displayed in parallel on the display screen of the touch panel, and operation buttons are respectively arranged in the images displayed in parallel. In this case, if the position of the boundary between the images displayed in parallel on the display screen of the touch panel is changed so as to enlarge and reduce the images, the position of each of the operation buttons arranged in the images may be inevitably changed, degrading operational performance.

An object of the invention is to provide an information processing device and an image processing device which facilitate a button operation on a touch panel. Another object of the invention is to provide an information processing device and an image processing device which can change the position of the boundary between images displayed in parallel without degrading operational performance of operation buttons displayed on the touch panel.

Solution to Problem

In order to achieve the above-described object, according to the invention, a region related to a navigation function and a region related to functions other than the navigation function are separated from each other by a movable boundary on a display screen of a touch panel.

That is, the invention provides an information processing device capable of processing navigation information. The information processing device includes a touch panel capable of displaying images and receiving a touch operation by a user, and an image generation section which generates a navigation image including a map image and a plurality of operation button images for receiving the touch operation, the images being displayed on the touch panel. The plurality of operation button images include a first operation button image related to a navigation function and a second operation button image related to a plurality of functions other than the navigation function. The image generation section generates a first image which is obtained by combining the navigation image and the first operation button image and a second image which includes the second operation button. The first image and the second image are respectively displayed in the first display region and the second display region. The first display region and the second display region are separated by a movable boundary.

The touch panel of the information processing device can receive a user's touch operation, and an operation related to a plurality of functions which are realized by various electronic apparatuses or functional sections is realized by a user's touch operation.

The information processing device displays a navigation image or an operation button images related to a plurality of functions on the touch panel. A plurality of functions refer to specific functions which are realized in accordance with a user's request by electronic apparatuses externally connected to the information processing device or functional sections embedded in the information processing device. The electronic apparatuses or functional sections execute specific functions in cooperation with the touch panel. Examples of the specific functions include a television broadcast receiving function, a reproduction function of a portable music player, a navigation function of guiding a route, and the like.

The image generation section generates a first image which is obtained by combining an operation button image and a navigation image including a map image on the basis of graphic data. Graphic data which is referenced by the image generation section in generating such an image is data which is artificially created in advance and stored in storage means. The image generation section accesses the storage means to reference graphic data. The navigation image is generated by the image generation section on the basis of graphic data which is generated by a navigation device externally connected to the information processing device or a navigation function realized in the information processing device. The navigation image is an image which includes an icon or a map representing the position of the information processing device, the enlarged view of an intersection, or the like. From the viewpoint of improvement of operational performance of a touch operation, the operation button image is arranged in a desired region. For example, when the navigation device is configured so as to be mounted in a vehicle, the operation button image is arranged on the driver's seat side or the lower side of the touch panel on which the operation button image is easily operated from the driver's seat of the vehicle.

The image generation section performs processing for dividing the display surface of the touch panel into a plurality of regions and generating images. That is, one of a plurality of display regions is set as a first display region, and information related to the navigation function is displayed in the first display region. Another display region other than the first display region from among a plurality of display regions is set as a second display region, and information related to a plurality of functions other than the navigation function is displayed in the second region. The position, shape, or size of each of the display regions in the display surface of the touch panel is not fixed and can be freely adjusted in accordance with a user's touch operation or the like. The image generation section generates images such that the operation button images related to assigned functions are respectively displayed in the defined display regions, and the display regions are separated by a movable boundary. Thus, even when the operation button image related to the navigation function and the operation button image related to functions other than the navigation function are displayed on the touch panel simultaneously, the display regions of the screen related to both functions are divided by the boundary. Thus, the user is less likely to make a mistake regarding a touch operation of an operation button image. Therefore, it is possible to facilitate a button operation on the touch panel.

The functions other than the navigation function are functions which are realized by electronic apparatuses externally connected to the information processing device or the functional sections in the information processing device, and refer to functions not related to the navigation function. For example, an audio reproduction function, a broadcast wave receiving function, and the like may be exemplified.

The second image may include a function selection region where a plurality of function selection button images each for selecting a corresponding one of a plurality of functions are displayed, and a function operation region where a plurality of functional operation button images each for operating a function selected by the corresponding function selection button image are displayed. With the information processing device configured as above, a function selection button image which receives selection of a function and a functional operation button image for operating the selected function are displayed in the second display region. For this reason, even when the first operation button image related to the navigation function and the second operation button image related to functions other than the navigation function are displayed simultaneously, the user is less likely to make a mistake regarding a touch operation of an operation button image. The second image includes a function selection region in which a function selection button image is arranged and a function operation region in which a functional operation button image is arranged. Thus, in the second display region, the user is less likely to make a mistake regarding a button operation at the time of an operation to select a function and an operation related to each function.

The size of the first display region is enlargeable, and in the touch panel, the position of the first operation button image before the size of the first display region is enlarged may be the same as the position of the first operation button image after the size of the first display region is enlarged. The size of the second display region is enlargeable, and in the touch panel, the position of the second operation button image before the size of the second display region is enlarged may be the same as the position of the second operation button image after the size of the second display region is enlarged. The second operation button image may be related to one basic operation from a plurality of functions, and when the size of the second display region is enlarged, an extended operation button image related to one extensive operation from a plurality of functions may be displayed in the enlarged second display region.

The size of the display region of the first image and the size of the display region of the second image have to be adjustable in accordance with a user's request or the like. That is, when there is little necessity for information related to the navigation function, a lot of information related to functions other than the navigation function has to be displayed, and when information related to the navigation function is important, a lot of information related to the navigation function has to be displayed. However, in changing the size of the display region, the position of an operation button image related to each function may be changed, and it is difficult to intuitively understand a function to which a displayed image is related.

When the display region of an image corresponding to each function is defined in the touch panel, if it is configured such that the size of each display region is changed in accordance with the necessity for each function, it becomes possible to provide a display region of a size according to the necessity. The position of an operation button image related to each function is maintained, making it easy to understand a function to which a displayed operation button image is related. Thus, operational performance is improved. Changing the size of a display region can be realized by operating an operation button image displayed on the touch panel, an operation button provided in a casing surrounding the touch panel, or the like.

On the other hand, in changing the size of a display region, there may be a portion in the same display region and a portion outside the display region before and after changing. In an image generated by the above-described image processing device, the operation button image related to each function is displayed in the corresponding display region. Thus, even when each display region is enlarged and reduced, the image generation section generates images such that an operation button image is continuously displayed at the same position on the display surface while the position of the operation button image is not changed. Therefore, it becomes possible to provide a display region of a size according to the necessity of each function without degrading operational performance.

The first display region may be arranged on one side of the left and right sides of the touch panel, and the second display region may be arranged on the other side of the left and right sides of the touch panel. The first display region may be arranged on the driver's seat side of a vehicle in which the information processing device is mounted.

If it is configured such that the information processing device is mounted in a vehicle, the navigation function functions to guide a driver through the route of the vehicle. Thus, if the operation button image related to the navigation function is displayed on a side close to the driver, the driver easily operates the operation button image. For this reason, if the first display region is located on the driver's seat side, the driver's button operation is facilitated. Meanwhile, the operation button image related to functions other than the navigation function may be displayed on a side distant from the driver. The first image including the navigation image and the first operation button image related to the navigation function is displayed on the driver's seat side, and the second image including the second operation button image related to functions other than the navigation function is displayed on a front passenger's seat side, making it possible to improve visibility of the touch panel.

The movable boundary may be moved to reduce the first display region and to enlarge the second display region, or to reduce the second display region and to enlarge the first display region.

As described above, in the environment in which the installment space of an electronic apparatus is limited, it is difficult to secure a sufficiently large display screen of the touch panel. For this reason, in changing the size of each display region, it is necessary to change the size of another display region. Thus, the enlargement and reduction of the second display region are carried out simultaneously with the enlargement and reduction of the first display region. Therefore, the display screen of the touch panel is effectively utilized, and as a result, this contributes to improving operational performance of a button operation on the touch panel.

The information processing device may further include receiving means for receiving positional data of the information processing device, and storage means for storing map data. The navigation function may generate graphic data for drawing the navigation image on the basis of positional data and map data. The image generation section may generate the navigation image on the basis of graphic data. The first operation button image may include at least one of a button image for displaying a screen for setting the navigation function, a button image for displaying a screen for setting a destination of a vehicle, and a button image for enlarging and reducing the map image. A plurality of functions images may include an audio function of outputting sound through a speaker, and the predetermined second operation button image may include at least one of a music selection button image and a radio broadcast selection button image.

With the information processing device configured as above, an image is displayed in which an image (first operation button image) which realizes a touch operation related to the navigation function is arranged in the first display region, and an image (second operation button image) which realizes a touch operation related to the audio function is arranged in the second display region, realizing the operations related to both functions. Therefore, even when a button operation related to a certain function is carried out, it becomes possible for the user to easily carry out the button operations related to both functions without making a mistake regarding a touch operation of an operation button image.

The image generation section may generate the images which are displayed on the touch panel such that the second operation button image is highlighted in accordance with the history of the touch operation. With the information processing device configured as above, from among the operation button images which are displayed on the touch panel, a button image which has frequently been operated or a button image which has previously been operated is particularly noticeable. Thus, even when an operation button image is displayed along with the map image of the navigation image or the like, the user can easily recognize a button image which is frequently operated. Therefore, it is possible to prevent the user from making a mistake regarding a button operation.

The image generation section may move the boundary to enlarge the first display region and may generate an image in which only the first image is displayed on the touch panel.

When an image in which only the first image is displayed on the touch panel is generated, the image generation section may move the boundary to reduce the first display region and may generate an image in which the first image and the second image are displayed on the touch panel.

The image generation section may move the boundary to enlarge the second display region and may generate an image in which only the second image is displayed on the touch panel.

When an image in which only the second image is displayed on the touch panel is generated, the image generation section may move the boundary to reduce the second display region and may generate an image in which the first image and the second image are displayed on the touch panel.

The image generation section may generate an animation image in which the boundary is gradually slid when moving the boundary.

An animation image in which it seems like the boundary is gradually slid is displayed, making it easy to the relative positional relationship between the first image and the second image. Therefore, it becomes possible to improve operational performance when the user changes the display range of the navigation image.

The image generation section may generate an animation image such that, in the navigation image, the position of the information processing device is located at the center of the first display region while the boundary is gradually slid.

The navigation image and information around the position of the information processing device are information which is most necessary for the user, and information of a location distant from the position is less necessary for the user. Therefore, the position of the information processing device is displayed at the center of the first display region where the navigation image is displayed, making it possible to appropriately display information necessary for the user.

The invention can also be embodied as an image processing device capable of generating images. That is, the invention provides an image processing device capable of generating images which are displayed on a touch panel capable of receiving a user's touch operation. The image processing device includes an image generation section which generates a navigation image including a map image and a plurality of operation button images for receiving the touch operation, the images being displayed on the touch panel. A plurality of operation button images include a first operation button image related to a navigation function and a second operation button image related to a plurality of functions other than the navigation function. The image generation section generates a first image which is obtained by combining the navigation image and the first operation button image and a second image which includes the second operation button image. The first image and the second image are respectively displayed in the first display region and the second display region. The first display region and the second display region are separated by a movable boundary.

The invention can also be embodied as a computer program which generates images to be displayed on a touch panel.

BRIEF DESCRIPTION OF DRAWINGS

FIG. 29 is a diagram of a processing flow of graphic processing of a navigation device according to a modification.

FIG. 30 shows a table in a navigation device according to a modification.

DESCRIPTION OF EMBODIMENTS

Hereinafter, the best mode for carrying out the invention will be illustratively described. The following embodiment is just for illustration, and the invention is not limited thereto.

<Configuration>

Figure 1:
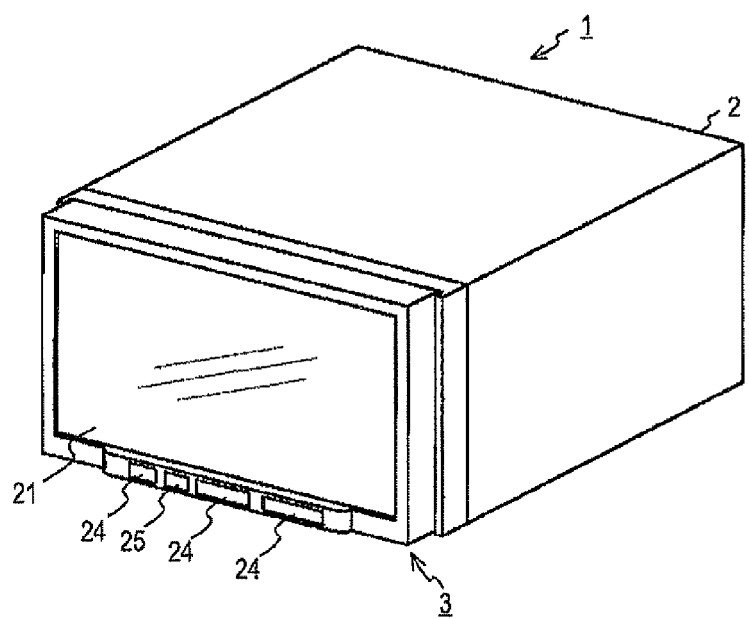
FIG. 1 is an appearance diagram of a navigation device.

FIG. 1 is an appearance diagram of a navigation device 1 (an example of an information processing device) according to an embodiment of the invention. Examples of the navigation device include an in-vehicle navigation device, such as AVN (Registered Trademark: Audio Visual Navigation) manufactured by Fujitsu Ten Limited or the like. However, the invention may be applied to, for example, a portable navigation function-equipped electronic apparatus or the like. The invention may also be applied to an image process device which is externally connected to or embedded in a navigation device or a portable navigation function-equipped electronic apparatus to generate a navigation image. The navigation device 1 of this embodiment is a car navigation device suitable for 2DIN (Deutsche Industrie Normen) having a main body and a monitor as a single body, and has a car navigation function of guiding a current position of a vehicle or a route to a destination or the like, a reproduction function of reproducing various audio/visual (hereinafter, referred to as AV) contents, a function of receiving broadcast waves, and the like. The navigation device 1 is used in a state of being installed around the center of the dashboard where a passenger at a driver's seat or a front passenger's seat easily reaches, and includes a main unit 2 and a display unit 3.

Figure 2:
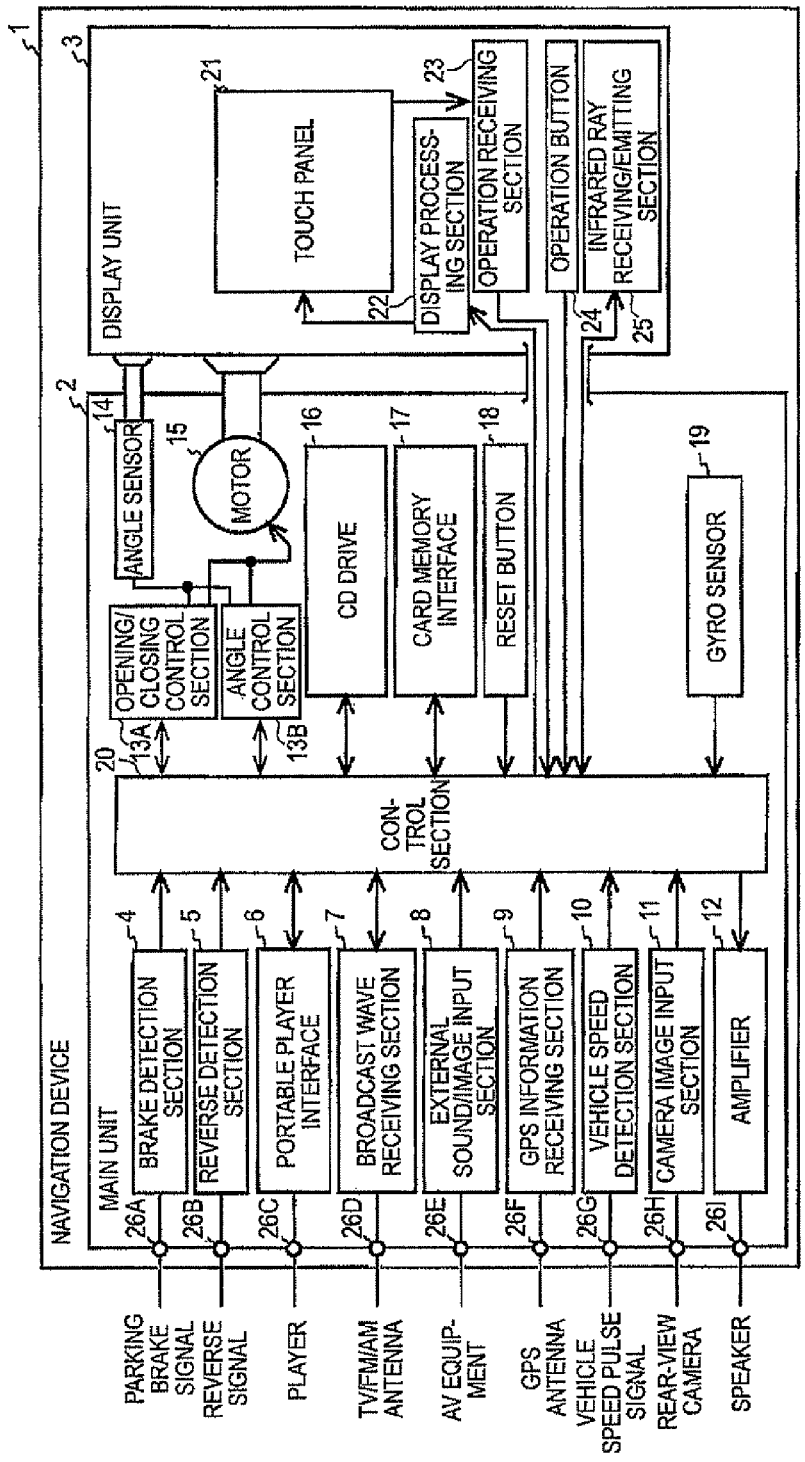
FIG. 2 is a configuration diagram of a navigation device.

FIG. 2 is a configuration diagram of the navigation device 1. The main unit 2 includes electronic components, and is embedded with a brake detection section 4, a reverse detection section 5, a portable player interface 6, a broadcast wave receiving section 7, an external sound/image input section 8, a GPS information receiving section 9 (an example of receiving means), a vehicle speed detection section 10, a camera image input section 11, an amplifier 12, an opening/closing control section 13A, an angle control section 13B, an angle sensor 14, a motor 15, a CD drive 16, a card memory interface 17, a reset button 18, a gyro sensor 19, and a control section 20 (an example of an image processing device). The display unit 3 mainly displays various kinds of information regarding the passengers of the vehicle in the form of an image, and includes devices which play a role of receiving a user's operation. The display unit 3 is embedded with a touch panel 21, a display processing section 22, an operation receiving section 23, an operation button 24, and an infrared ray receiving/emitting unit 25.

Hereinafter, the configuration of the main unit 2 will be described. The brake detection section 4 detects whether or not the parking brake of the vehicle is applied, and notifies the detection result to the control section 20. The brake detection section 4 detects the state of the brake from the conduction state of a switch which is switched on/off in interlocking with the motion of the parking brake lever (or pedal). The brake detection section 4 electrically detects the conduction state of the switch through a terminal 26A.

The reverse detection section 5 detects whether or not the gearshift of the vehicle is at the reverse position (backward movement) and notifies the detection result to the control section 20. The reverse detection section 5 detects the state of the gearshift from the on/off of a switch which moves in interlocking with the gearshift. The reverse detection section 5 electrically detects the conduction state of the switch through a terminal 26B.

The portable player interface 6 is an interface for bidirectional communication with a portable player (for example, iPOD (Registered Trademark) which reproduces music or the like. If a portable player is externally connected, the portable player interface 6 starts bidirectional communication to send an audio signal from the player to the control section 20 and to send a control signal, such as reproduction start or music selection, from the control section 20 to the player. The portable player interface 6 performs communication with the player through a cord connected to a terminal 26C.

The broadcast wave receiving section 7 is a circuit which includes a One Seg tuner (the application for trademark registration for "One Seg" is pending), an AM (Amplitude Modulation) tuner, and an FM (Frequency Modulation) tuner. The broadcast wave receiving section 7 controls the reception state of the tuner in accordance with the control signal from the control section 20 and sends signals of electric waves received by an antenna connected to a terminal 26D to the control section 20.

The external sound/image input section 8 is a circuit which receives a composite image signal or sound signal from a video/audio equipment connected to a terminal 26E and sends the composite image signal or sound signal to the control section 20.

The GPS (Global Positioning System) information receiving section 9 receives signals of electric waves from a GPS satellite received by a GPS antenna connected to a terminal 26F and sends the received signal to the control section 20. As well known in the art, the GPS is the system which measures the position of the vehicle on the basis of electric waves from at least three satellites from among many GPS satellites circulating the earth. The GPS information receiving section 9 processes the signals of electric waves of the GPS satellites circulating the earth. The signals from the GPS satellites received by the GPS information receiving section 9 are used in car navigation.

The vehicle speed detection section 10 is a circuit which detects a vehicle speed pulse signal generated in accordance with the rotation angle of the axle and sends the vehicle speed pulse signal to the control section 20. The vehicle speed pulse signal detected by the vehicle speed detection section 10 is a step-like vehicle speed pulse signal which is output from a vehicle speed sensor or an electronic control unit controlling the engine or brake of the vehicle, and is used in determining the vehicle speed from the number of pulses per unit time. If the number of pulses per unit time increases, the vehicle is accelerating, and if the number of pulses per unit time decreases, the vehicle is decelerating. The correlation between the speed of the vehicle and the vehicle speed pulses changes depending on the manufacturer who manufactures the vehicle, the vehicle type, the size of each wheel to be mounted, air pressure, or the like. For this reason, in the control section 20, the correlation between the speed of the vehicle and the vehicle speed pulses is appropriately updated from the correlation between the traveling distance of the vehicle calculated on the basis of the positioning result by the GPS and the number of pulses detected during traveling. The vehicle speed detection section 10 electrically detects the vehicle speed pulse signal output from the electronic control unit through a terminal 26G.

The camera image input section 11 is a circuit which receives an image signal from a rear-view camera which is a video camera photographing the rear side of the vehicle and sends the image signal to the control section 20. That is, when the reverse detection section 5 detects the reverse of the vehicle, the camera image input section 11 sends an image signal from the video camera connected to a terminal 26H to the control section 20.

The amplifier 12 is a circuit which amplifies a sound signal sent from the control section 20 to a speaker connected to a terminal 26I in the vehicle interior. The amplifier 12 can arbitrarily change the amplification factor in accordance with the control signal from the control section 20.

Figure 3:
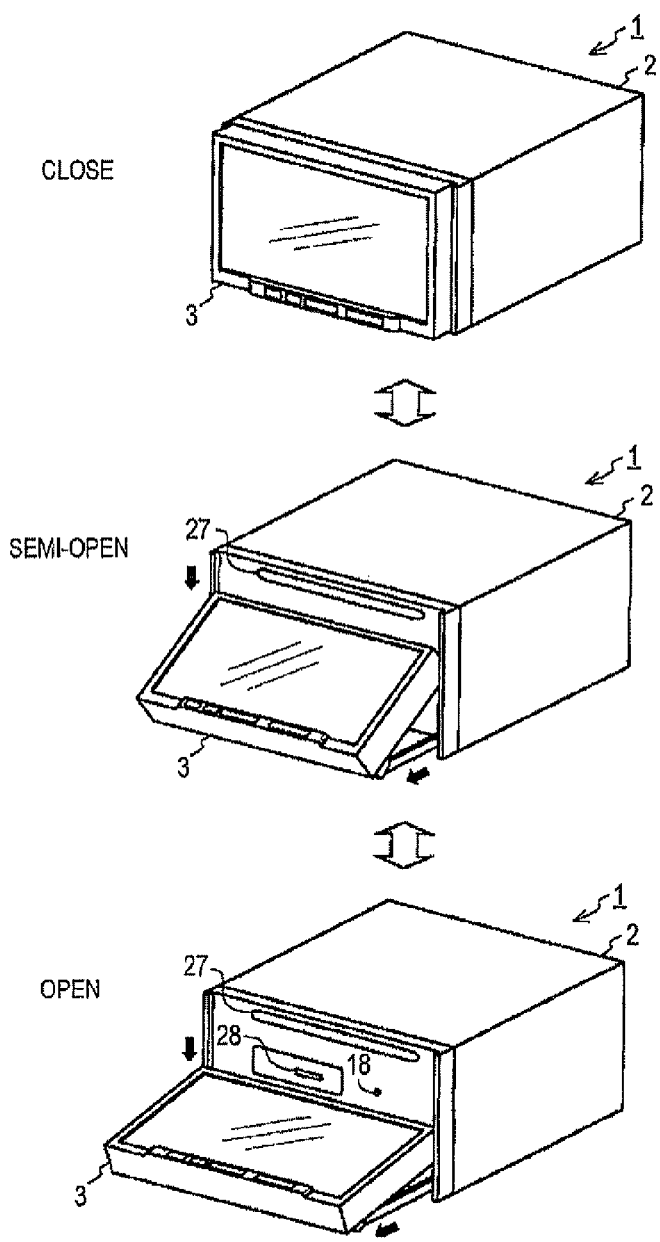
FIG. 3 is a diagram showing an operation of a display.

The opening/closing control section 13A is a circuit which carries out an opening/closing operation of the display unit 3. The opening/closing control section 13A controls the motor 15 in accordance with the control signal from the control section 20 or processes the signal from the angle sensor 14 to open/close the display unit 3. FIG. 3 shows the opening/closing operation of the display unit 3 which is realized when the opening/closing control section 13A controls the motor 15 when receiving the control signal from the control section 20. As shown in FIG. 3, the opening/closing control section 13A can adjust the pose of the display unit 3 in three stages and realizes a "close state" where a CD insertion slot 27 of the CD (Compact Disc) drive 16 is closed, a "semi-open" state where the CD insertion slot 27 of the CD drive 16 is open, and a "full open" state where a card insertion slot 28 of the card memory interface 17 or the reset button 18 is open. When the pose of the display unit 3 is in the "close" state, the CD insertion slot 27 or the card insertion slot 28 and the reset button 18 are hidden by the display unit 3. When the pose of the display unit 3 is in the "semi-open" state, the card insertion slot 28 or the reset button 18 is hidden by the display unit 3, and access can be made to the CD insertion slot 27 from the front side of the navigation device 1. When the pose of the display unit 3 is in the "full open" state, access can be made to the CD insertion slot 27, the card insertion slot 28, and the reset button 18 from the front side of the navigation device 1.

Figure 4:
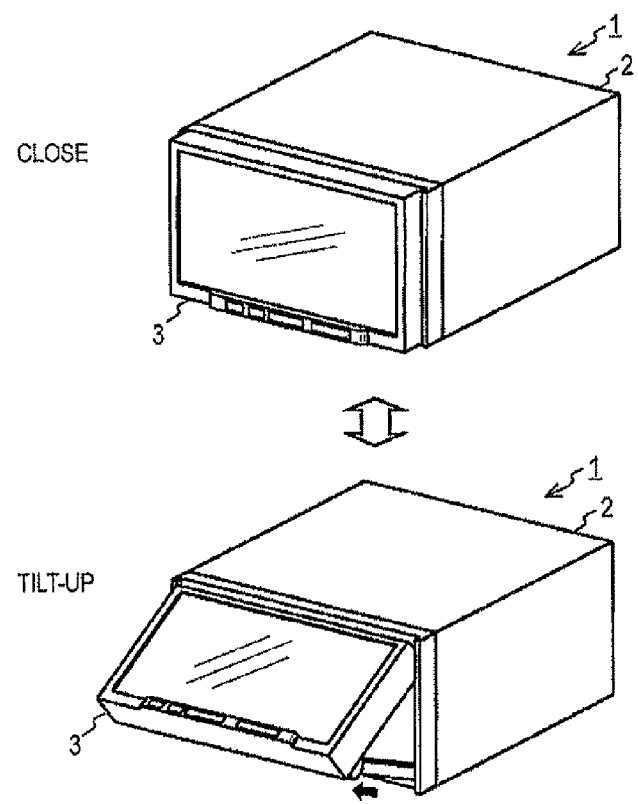
FIG. 4 is a diagram showing an operation of a display.

The angle control section 13B is a circuit which adjusts the angle of the display unit 3. Similarly to the opening/closing control section 13A, the angle control section 13B controls the motor 15 in accordance with the control signal from the control section 20 or processes the signal from the angle sensor 14 to adjust the angle of the display unit 3. The angle of the display unit 3 refers to the relative angle the front side of the main unit 2 and the front side of the display unit 3 (that is, the front side of the touch panel 21) centering on the axis extending in the left-right direction of the navigation device 1. FIG. 4 shows the angle adjustment state of the display unit 3 which is realized by the angle control section 13B. As shown in FIG. 4, the angle control section 13B adjusts the elevation angle of the display unit 3 in multiple stages to tilt up the display unit 3.

The angle sensor 14 is a sensor which detects the angle of the display unit 3, and notifies the detected angle as an electrical signal to the opening/closing control section 13A and the angle control section 13B. The motor 15 is a motor which adjusts the angle of the display unit 3, and moves up or down the upper end of the display unit 3 or moves the lower end of the display unit 3 forward and backward. If receiving the control signal from the control section 20, the opening/closing control section 13A and the angle control section 13B determines the difference between the angle of the display unit 3 detected by the angle sensor 14 and the target value of the angle determined on the basis of the control signal, and performs feedback control of the motor 15 such that the angle of the display unit 3 detected by the angle sensor 14 coincides with the target value.

The CD drive 16 is an optical disk reading device which reads a CD having recorded therein audio contents, such as music, and reproduces audio contents, and includes an optical pickup lens or light-emitting element, a disk driving motor, and the like.

The card memory interface 17 is a memory card reader/writer which reads and writes a nonvolatile semiconductor memory card with no storage holding operation. A memory card inserted into the card memory interface 17 has storage capacity of about 4 GB, and has recorded therein road information, such as highways or roads, map data including spot information (hereinafter, also referred to as POI (Point Of Interest) data) regarding various facilities, such as theme parks and gas stations, and data, such as telephone numbers or facilities names. The control section 20 accesses map data recorded in the memory card to realize all functions, route search of car navigation.

The gyro sensor 19 is a biaxial gyro sensor which is embedded in the main unit 2. The gyro sensor 19 enables vehicle positioning even when the GPS information receiving section 9 cannot receive the electric waves from the GPS satellites. When it is impossible to receive the electric waves from the GPS satellites, the control section 20 calculates the position of the vehicle is calculated on the basis of the vehicle speed detected by the vehicle speed detection section 10 and the traveling direction of the vehicle detected by the gyro sensor 19.

Figure 5A:
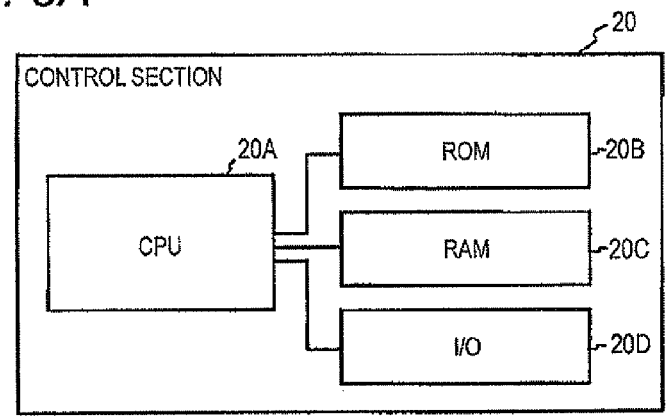
FIG. 5A is a configuration diagram showing a control section.

FIG. 5A is a configuration diagram of the control section 20. As shown in FIG. 5A, the control section 20 includes a CPU (Central Processing Unit) 20A, a ROM (Read Only Memory) 20B (an example of storage means), a RAM (Random Access Memory) 20C, an input/output (I/O) interface 20D, and the like. The ROM 20B stores graphic data of operation buttons, icons, and the like which are drawn on the touch panel 21 described below. If the accessory power supply of the vehicle is turned on, the control section 20 executes a computer program recorded in the ROM 20B to realize various functions by using data of the memory card inserted into the card memory interface 17, data stored in the RAM 20C, or the like. The details of various functions which are realized by the control section 20 will be described below.

Next, the constituent elements constituting the display unit 3 will be described. The touch panel 21 is a GUI (Graphical User Interface) in which a color liquid crystal display and a touch sensor are combined. In the touch panel 21, the screen is displayed with a 7.0-inch EGA (Enhanced Graphics Adapter) liquid crystal display, and if an icon or the like displayed on the screen is depressed, the touch sensor detects the depressing.

The display processing section 22 is a circuit which draws a screen to be displayed on the liquid crystal display of the touch panel 21. The display processing section 22 drives thin-film transistors arranged in the liquid crystal display in a lattice at uniform intervals on the basis of an image signal sent from the control section 20, and draws the screen of the touch panel 21.

If the touch sensor detects a touch operation on the touch panel 21, the operation receiving section 23 specifies the touched position on the screen and sends information of the specified position to the control section 20.

The operation button 24 is a mechanical button instead of a button (button image) which is displayed on the touch panel 21 in the form of an icon, and as shown in FIG. 1, an operation push-button switch which is arranged below the touch panel 21. The operation button 24 is constituted by an opening/closing button, a current location button, and a volume control button in order from the left side of the display unit 3. The volume control button is set such that, if the right side is pushed, the volume is turned up and, if the left side is pushed, the volume is turned down. If each button is depressed, a signal corresponding to the depressed button is sent to the control section 20. These buttons which are prepared by mechanical hardware, not buttons displayed on the touch panel 21 by software, are prepared as a minimum number of buttons from the viewpoint of an increase in operational performance of the navigation device 1. That is, the opening/closing button is required for testing an operation on the reset button 18 or unloading the CD in the CD drive 16 when the touch panel 21 is out of order, thus the opening/closing button is provided separately from the buttons to be displayed by software. Although the current location button is a basic function of displaying the current position in the navigation, when a method related to an operation related to the navigation function is not known, the current location button is a button for returning the screen to the initial navigation screen. The current location button is provided separately from the buttons which are displayed by software, such that there is an additional meaning to allow the user to feel comfortable that, if the button is only depressed, the screen returns to the initial navigation screen, that is, the screen in which the position of the host vehicle is displayed on the map. The volume control button is operated when the volume of the speaker is immediately turned down for any reason. Thus, the volume control button is provided separately from the buttons which are displayed by software, enabling an emergency operation. In such a manner, only buttons which are considered most important are prepared separately in the periphery of the touch panel 21 as hardware buttons, and other buttons are displayed on the touch panel 21 by software. Therefore, it is possible to improve operational performance of the navigation device 1 while securing a sufficient display space of the touch panel 21 and also to prevent the user from making a mistake regarding the operation of the navigation device 1.

The infrared ray receiving/emitting unit 25 is an interface for bidirectional communication between the navigation device 1 and a mobile phone using infrared rays, and is constituted by a light-emitting element which electrically emits infrared rays and a light-receiving element which converts the received infrared rays to electricity. The infrared ray receiving/emitting unit 25 sends the control signal or data from the control section 20 to the mobile phone and also sends the control signal or data from the mobile phone to the control section 20. As shown in FIG. 1, the infrared ray receiving/emitting unit 25 is arranged below the touch panel 21.

Figure 5B:
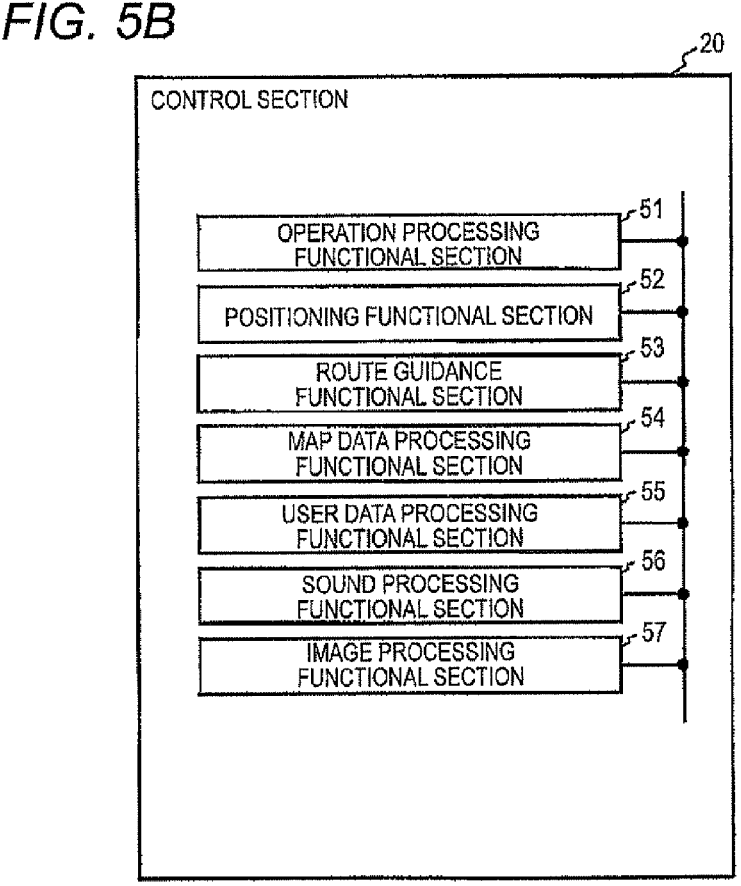
FIG. 5B is a functional block diagram of a control section.

Next, various functions which are realized by the control section 20 of the main unit 2 will be described in detail. FIG. 5B is a functional block diagram showing various functional sections which are realized by the control section 20. If the accessory power supply of the vehicle is powered on, as shown in FIG. 5B, the control section 20 executes a computer program which realizes an operation processing functional section 51, a positioning functional section 52, a route guidance functional section 53, a map data processing functional section 54 (an example of a navigation function), a user data processing functional section 55, a sound processing functional section 56, and an image processing functional section 57 (an example of an image generation section).

The operation processing functional section 51 displays an operation screen for controlling the operations of various functional sections on the touch panel 21 through the image processing functional section 57, or processes an operation signal from the operation receiving section 23, the operation button 24, or the reset button 18 and controls the operations of various functional sections.

If the accessory power supply of the vehicle is powered on, the positioning functional section 52 measures the position (latitude and longitude) of the vehicle on the basis of information of electric waves from the satellites sent from the GPS information receiving section 9, information of the vehicle speed notified from the vehicle speed detection section 10, and information of the angular speed sent from the gyro sensor 19.

The route guidance functional section 53 is a functional section which finds out the route from the current location of the vehicle to the destination set by the user and carries out route guidance. The route guidance functional section 53 finds out the traveling route from the position of the vehicle measured by the positioning functional section 52 to the destination from map data of the memory card inserted into the card memory interface 17. The route of the vehicle is guided by sound and images from the relationship between the found traveling route and the position of the vehicle.

The map data processing functional section 54 generates graphic data of the map displayed on the touch panel 21 on the basis of map data of the memory care inserted into the card memory interface 17 or data of the traveling route found by the route guidance functional section 53, data of VICS (Registered Trademark) road traffic information acquired from FM broadcast waves through the broadcast wave receiving section 7, positional data of the vehicle measured by the positioning functional section 52, and the like.

The user data processing functional section 55 writes spot information (for example, positional information of the home) to be registered by the user or history information of route search and setting information, such as display/non-display of icons, into the RAM 20C or reads the information from the RAM 20C.

The sound processing functional section 56 is a functional section which processes the signal of sound output from the speaker through the amplifier 12. That is, the sound processing functional section 56 sends an audio broadcast received by the broadcast wave receiving section 7, an audio signal acquired from the player by the portable player interface 6, or an audio signal to be reproduced by the CD drive 16 to the amplifier 12, or superimposes a sound signal of route guidance from the route guidance functional section 53 on the audio signal and sends the resultant signal to the amplifier 12.

The image processing functional section 57 is a functional section which generates image data to be displayed on the touch panel 21. That is, the image processing functional section 57 superimposes data of an operation screen generated by the operation processing functional section 51 and data of the screen of a map for display generated by the map data processing functional section 54 and sends the resultant signal to the display processing section 22, sends image data of television broadcast received by the broadcast wave receiving section 7 to the display processing section 22, or sends an image signal from the camera image input section 11 to the display processing section 22 in interlocking with the detection of the backward movement of the vehicle by the reverse detection section 5. The image processing functional section 57 stops the notification of image data if the brake detection section 4 detects the release of the parking brake in sending image data of television broadcast to the display processing section 22.

<Operation>

Figure 6:
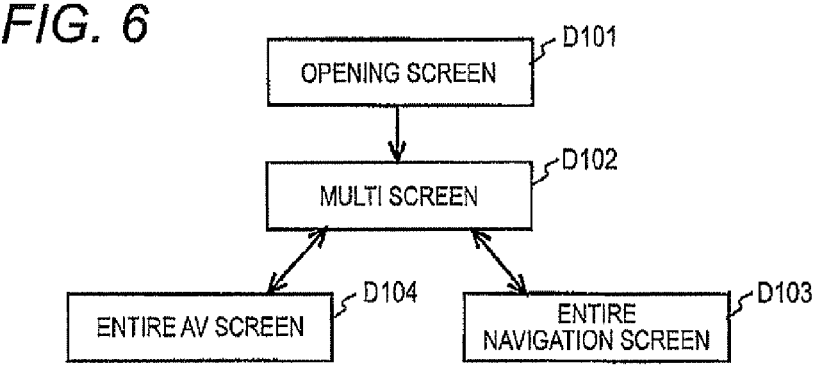
FIG. 6 is a screen transition diagram of a main screen of a navigation device.
Figure 7:
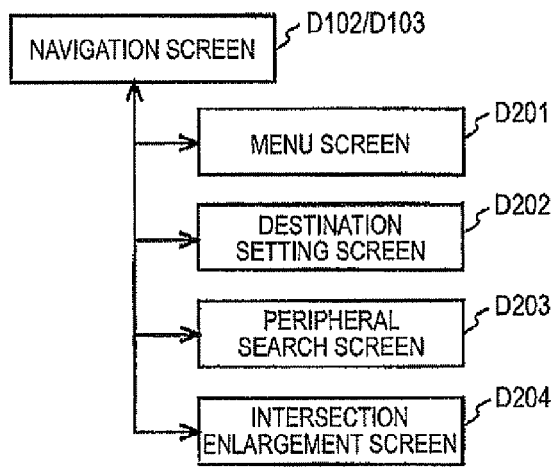
FIG. 7 is a screen transition diagram of navigation.
Figure 8:
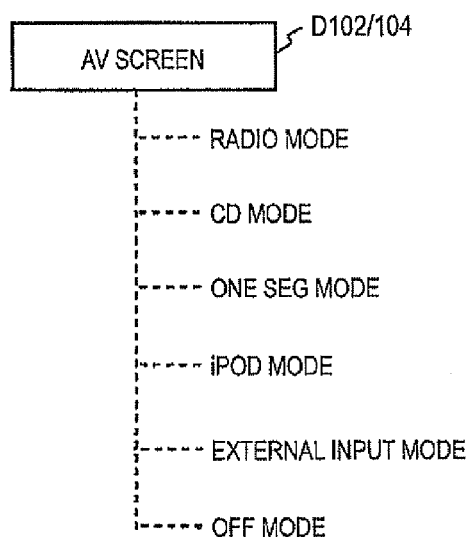
FIG. 8 is a diagram showing a display mode of an AV screen.

Hereinafter, the operation of the navigation device 1 will be described. FIG. 6 is a screen transition diagram of the main screen of the navigation device 1. FIG. 7 is a screen transition diagram regarding navigation. FIG. 8 is a diagram showing the display mode of the AV screen. Hereinafter, the operation of the navigation device 1 will be described with reference to FIGS. 6 to 8.

(D101) An opening screen (D101) will be described. If the accessory power supply of the vehicle is powered on and power is supplied to the navigation device 1, the control section 20 executes the computer program stored in the ROM 20B to initialize the navigation device 1 and to realize various functional sections shown in FIG. 5B. The image processing functional section 57 references data of the opening screen stored in the ROM 20B and causes the touch panel 21 to display the opening screen. While the opening screen is displayed, the following processing is performed in each functional section of the control section 20. That is, the operation processing functional section 51 scans a signal from the operation receiving section 23, the operation button 24, or the reset button 18 to receive a user's operation. The positioning functional section 52 processes positioning information acquired by the GPS information receiving section 9 or a signal from the vehicle speed detection section 10 or the gyro sensor 19, and measures the position of the vehicle. The map data processing functional section 54 accesses the card memory inserted into the card memory interface 17 and reads map data around the position of the host vehicle measured by the positioning functional section 52.

Figure 9:
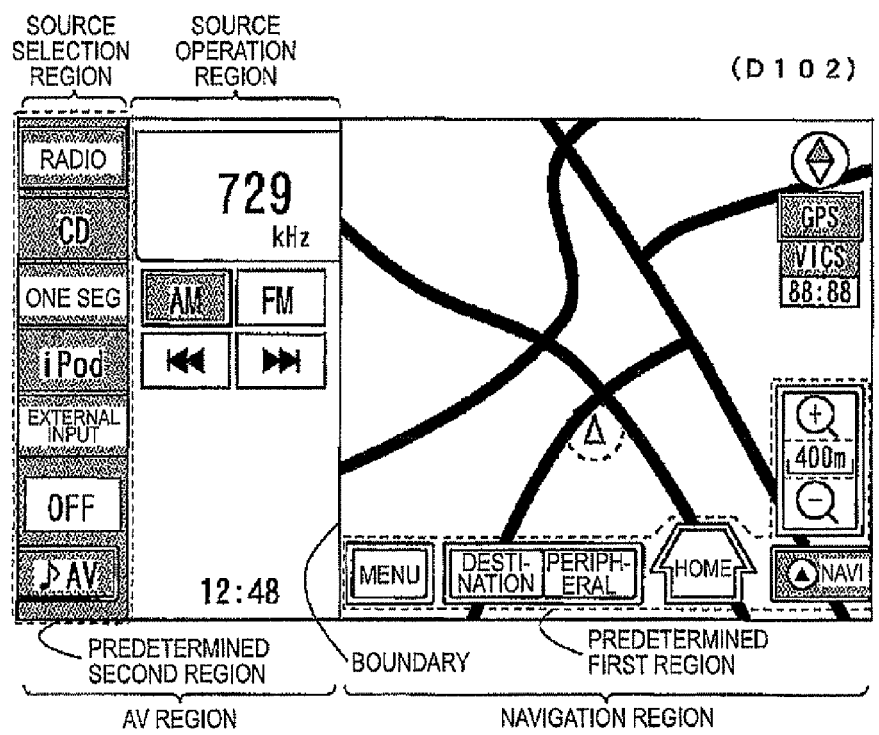
FIG. 9 is a diagram of a multi screen.

(D102) Next, a multi screen (D102) will be described. If four seconds has elapsed after the opening screen has been displayed, the image processing functional section 57 generates the multi screen (D102), in which the operation screen (an example of a second image) for AV and the operation screen (an example of a first image) for navigation are arranged, on the basis of image data of operation buttons stored in the ROM 20B or map data read by the map data processing functional section 54, and displays the multi screen (D102) on the touch panel 21. FIG. 9 is a diagram of the multi screen. As shown in FIG. 9, the image processing functional section 57 generates image data such that an image including operation buttons (an example of a second operation button image) for AV (an example of a plurality of functions other than a navigation function. In particular, a function related to radio, CD, or iPod is an example of an audio function) is displayed in the AV region (an example of a second display region) arranged on the left side of the touch panel 21, and an image in which a map image for navigation (an example of a navigation function) and operation buttons (an example of a first operation button) are combined is displayed in the navigation region (an example of a first display region) arranged on the right side of the touch panel 21. In this embodiment, the navigation device 1 is configured so as to be mounted in a vehicle with the steering wheel on the right side, thus the navigation region is arranged on the right side of the touch panel 21, that is, on the driver's seat side. When the navigation device 1 is configured so as to be mounted in a vehicle with the steering wheel on the left side, the navigation region may be arranged on the left side of the touch panel 21. The navigation device 1 groups operations related to AV and operations related to navigation, and divides the display region. As shown in FIG. 9, the navigation region and the AV region are separated by a boundary. As described below, the boundary is movable. The AV region is divided into a source selection region (an example of a function selection region) where operation buttons for selecting a source are collectively displayed and a source operation region (an example of a function operation region) where a button or information regarding a selected source is displayed.

As shown in FIG. 9, the image processing functional section 57 displays "radio", "CD", "One Seg", "iPod", "external input", "OFF", and "AV" buttons (an example of function selection buttons) in the source selection region of the AV region. If any source button is touched, the source is selected. These buttons are arranged in a predetermined second region which defines a portion of the display surface of the touch panel 21. The predetermined second region is the region where the operation buttons related to the AV function are arranged. In this embodiment, the operation buttons related to the AV function are arranged in the left portion of the touch panel 21 such that an operation is easily carried out in the front passenger's seat. In the example of FIG. 9, "radio" is selected, received frequency and operation buttons (an example of functional operation buttons) or information regarding a selected source, such as an AM/FM switching button and a selection button, are displayed in the source operation region. Thus, at this time, the sound processing functional section 56 outputs audio signal of AM broadcast received by the broadcast wave receiving section 7 from the speaker through the amplifier 12. On the other hand, the image processing functional section 57 displays "menu", "destination", "peripheral", "home", "navigation", "map enlargement", and "map reduction" buttons in the navigation region, in addition to a map which is drawn on the basis of map data read by the map data processing functional section 54. These buttons are arranged in a predetermined first region which defines a portion of the display surface of the touch panel 21. The predetermined first region is the region where the operation buttons related to the navigation function are arranged. In this embodiment, the operation buttons related to the navigation function are arranged in the lower portion or the right portion of the touch panel 21 such that the driver easily operates the operation buttons. In the multi screen (D102), there are two regions of the AV region and the navigation region simultaneously, thus the AV region is narrower than in the entire AV screen (D104). Thus, the basics from among the operation buttons or information related to the source are displayed in the source operation region of the multi screen (D102).

In the multi screen (D102), if the operation processing functional section 51 detects that the "navigation" button is depressed, the image processing functional section 57 carries out transition to the screen display state of the multi screen to the entire navigation screen (D103). In the multi screen (D102), if the operation processing functional section 51 detects that the "AV" button is depressed, the image processing functional section 57 carries out transition to the screen display state of the entire AV screen (D104). A case where other buttons are depressed will be described in detail after the description of the entire navigation screen (D103) and the entire AV screen (D104).

Figure 10:
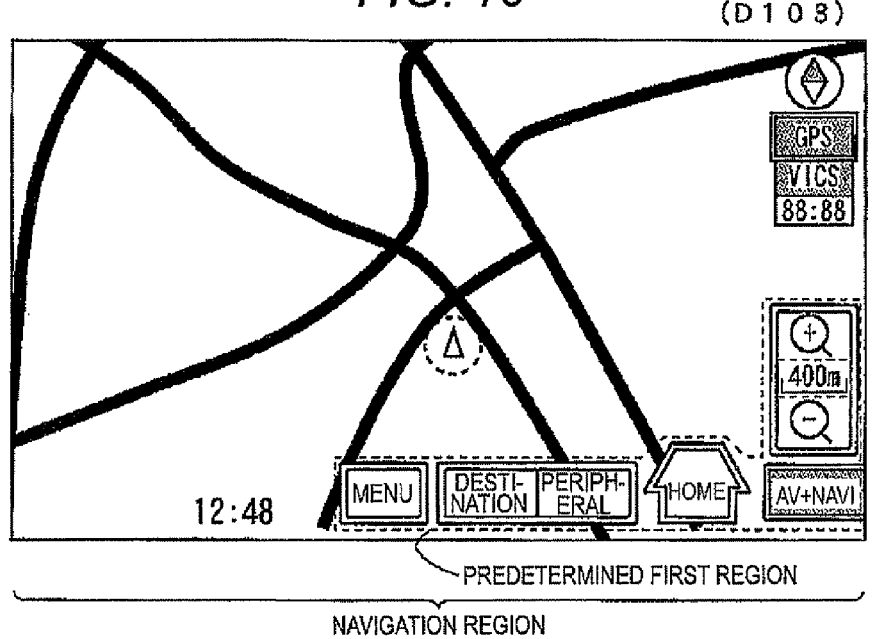
FIG. 10 is a diagram of an entire navigation screen.

(D103) Next, the entire navigation screen (D103) will be described. If the operation processing functional section 51 detects that the "navigation" button displayed on the multi screen (D102) is depressed, the image processing functional section 57 moves the boundary to enlarge the size of the navigation region and to reduce the size of the AV region. Then, the navigation region is enlarged and displayed over the entire screen such that the AV region is hidden and only the operation screen for navigation is displayed on the touch panel 21. FIG. 10 is a diagram of the entire navigation screen. As shown in FIG. 10, the image processing functional section 57 hides the AV region and displays the navigation region over the entire screen of the touch panel 21.

As shown in FIG. 10, similarly to the multi screen (D102), the map or the operation buttons (first operation button images), such as "menu" and "destination", are displayed in the navigation region. The image processing functional section 57 displays the screen such that the icon of the position of the host vehicle which is displayed on the entire navigation screen is located at the center of the navigation region (centering). For this reason, when the display screen of the touch panel 21 is transited from the multi screen (D102) to the entire navigation screen (D103), display of the icon of the position of the host vehicle or the map is slightly scrolled (slid) within the screen. Meanwhile, the image processing functional section 57 displays the screen such that the operations button, such as "menu" or "destination", is at the same position and has the same size on the display screen of the touch panel 21. For this reason, even when the display screen of the touch panel 21 is transited from the multi screen (D102) to the entire navigation screen (D103), the operation buttons for navigation are not scrolled (slid) on the screen of the touch panel 21 and continue to be displayed at the same position and of the same size. Only the display of the "navigation" button is switched to an "AV+navigation" button. If the "AV+navigation" button is depressed, the image processing functional section 57 switches display from the entire navigation screen (D103) to the multi screen (D102).

Figure 11:
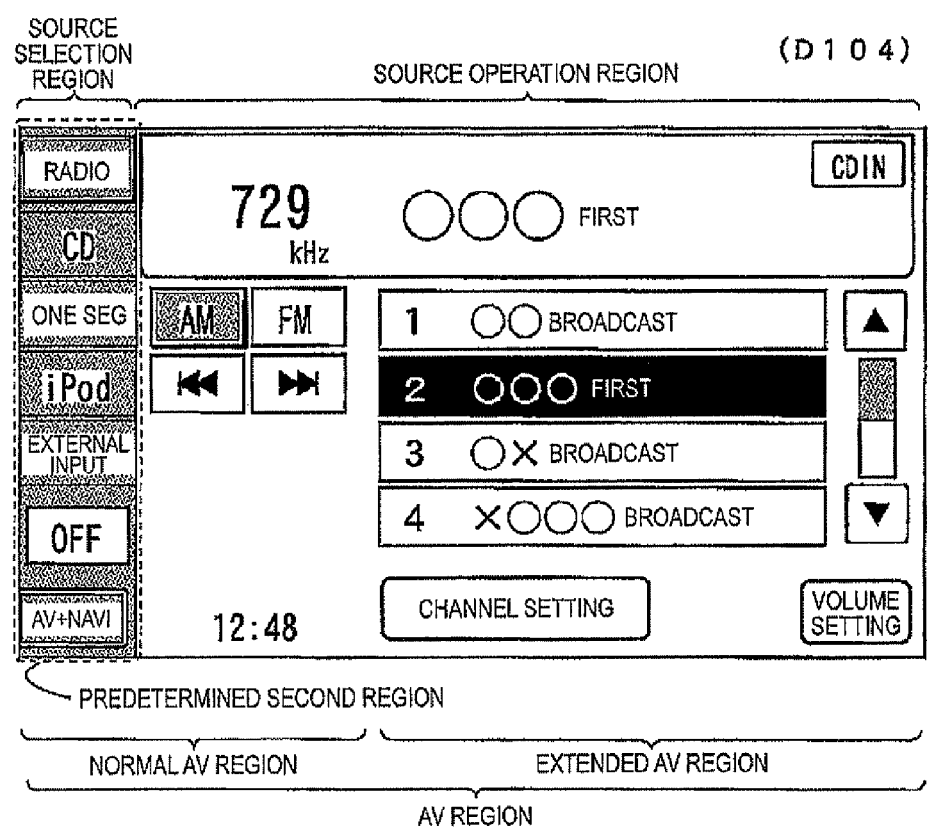
FIG. 11 is a diagram of an entire AV screen.

(D104) Next, the entire AV screen (D104) will be described. If the operation processing functional section 51 detects that the "AV" button displayed on the multi screen (D102) is depressed, the image processing functional section 57 moves the boundary to reduce the size of the navigation region and to enlarge the size of the AV region. Then, the AV region is enlarged and displayed over the entire screen such that the navigation region is hidden and only the operation screen for AV is displayed on the touch panel 21. FIG. 11 is a diagram of the entire AV screen. As shown in FIG. 11, the image processing functional section 57 hides the navigation region and displays the AV region over the entire screen of the touch panel 21.

As shown in FIG. 11, similarly to the multi screen (D102), the "radio", "CD", "One Seg", "iPod", "external input", and "OFF" buttons are displayed in the source selection region of the AV region. In the AV region, the source operation region is enlarged, and a selection button of broadcast station name or preset, a channel setting button, and a volume setting button (an example of extended operation button image) which have not been displayed on the multi screen (D102) are displayed. Displayed is also "CNN" indicating that a CD is inserted into the CD drive 16. In the AV region, the "radio", "CD", "One Seg", "iPod", "external input", and "OFF" buttons which have been displayed on the multi screen (D102) are displayed at the same positions. That is, the width of the source selection region is not changed between the multi screen (D102) and the entire AV screen (D104). Only the display of the "navigation" button is switched to the "AV+navigation" button. Hereinafter, a region which is displayed on both the multi screen and the entire AV screen is referred to as an "normal AV region", and a region which is displayed only the entire AV screen is referred to as an "extended AV region". If the "AV+navigation" button is depressed, the image processing functional section 57 switches display from the entire AV screen (D104) to the multi screen (D102). In the entire AV screen (D104), since there is no navigation region, the AV region is wider than in the multi screen (D102). Thus, in the source operation region of the entire AV screen (D104), all operation buttons or information related to the source is displayed. As described above, the display region with the operation buttons or information of a source to be displayed only in the entire AV screen (D104) is the "extended AV region" and constitutes a part of the source operation region. The display region with the operation buttons or information of a source to be displayed in both the multi screen (D102) and the entire AV screen (D104) is the "normal AV region" and constitutes a part of the source operation region and the source selection region.

Figure 12:
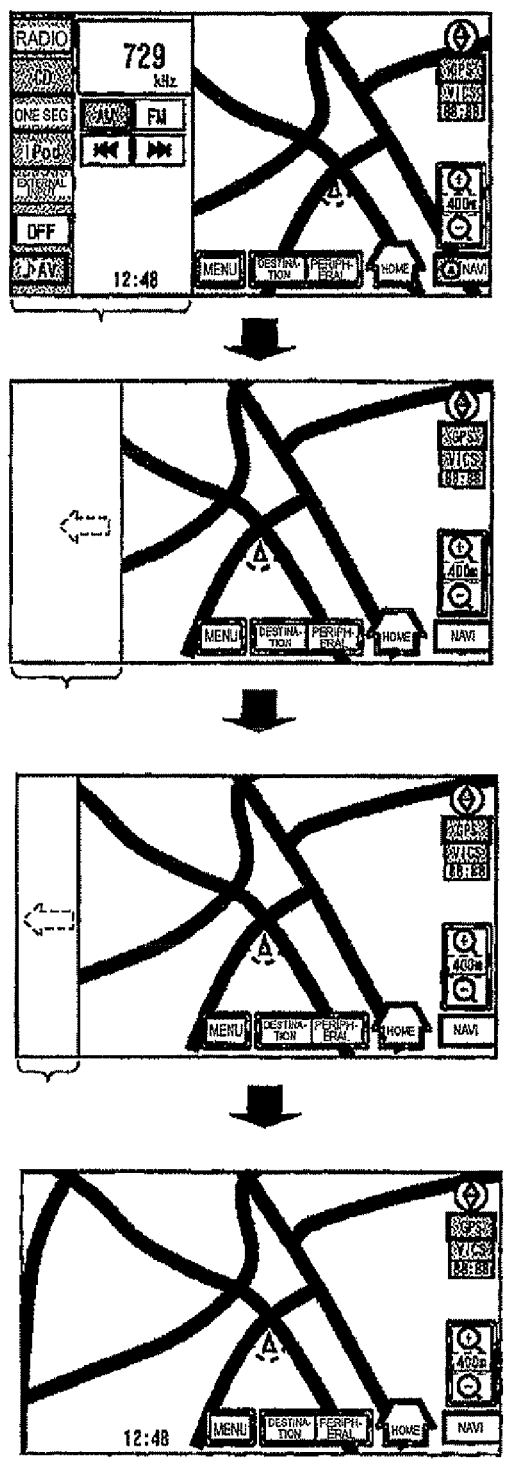
FIG. 12 is a diagram showing a way of hiding an AV region.
Figure 13:
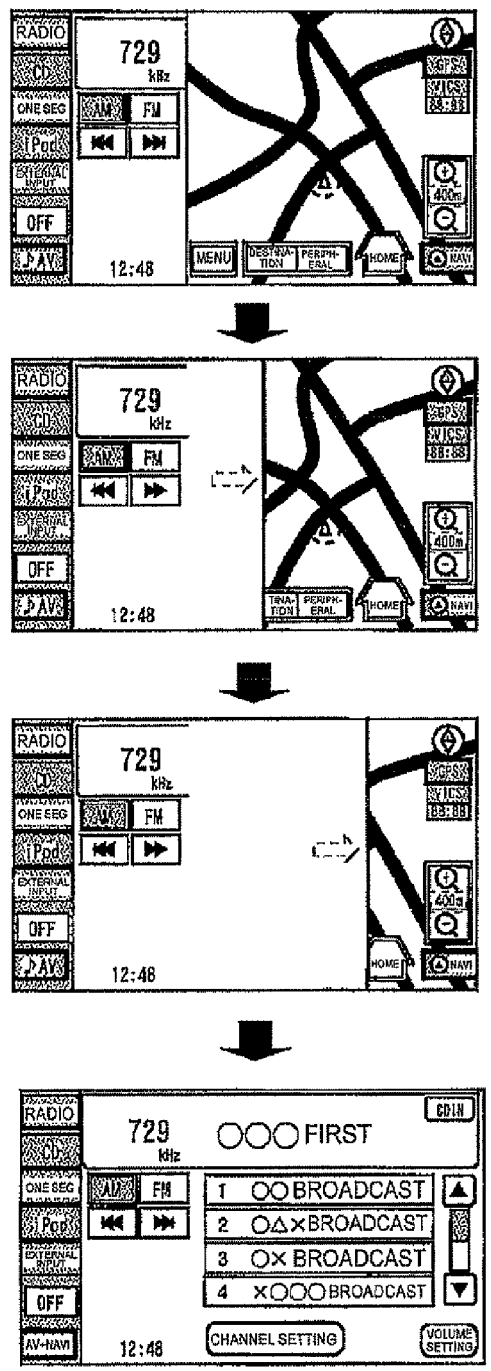
FIG. 13 is a diagram showing a way of hiding a navigation region.
Figure 14:
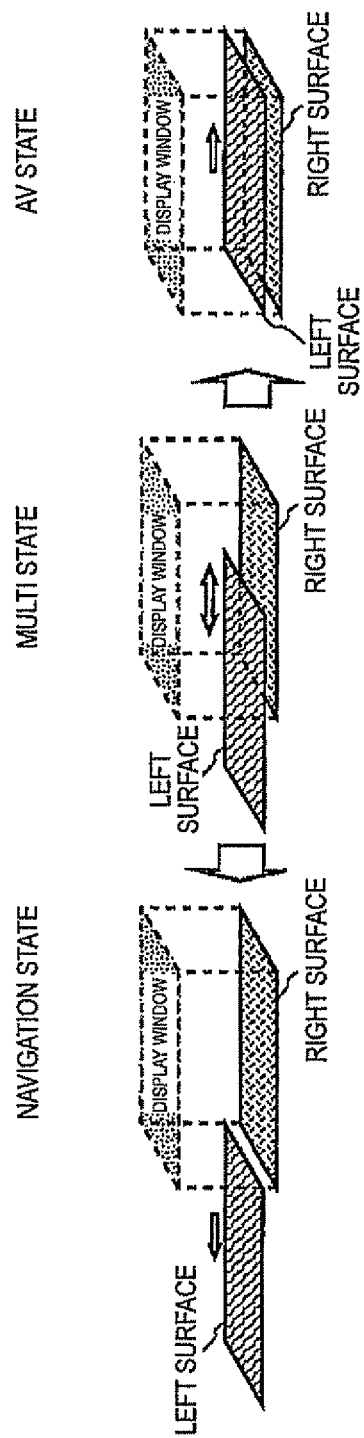
FIG. 14 is a conceptual diagram showing screen transition of a main screen.

The screen transition (FIG. 6) of the main screen of the navigation device 1 is as described above. Hereinafter, detailed description will be provided as to a way of moving the navigation region and the AV region on the screen at the time of screen transition from the multi screen (D102) to the entire navigation screen (D103) or the entire AV screen (D104). FIG. 12 is a diagram showing a way of hiding the AV region at the time of transition from the multi screen (D102) to the entire navigation screen (D103). FIG. 13 is a diagram showing a way of hiding the navigation region at the time of transition from the multi screen (D103) to the entire AV screen (D104). The image processing functional section 57 generates an animation image in which the boundary between the navigation region and the AV region is gradually slid such that, in switching display from the multi screen to the entire navigation screen or the entire AV screen, it seems like the navigation region and the AV region is scrolled (slid). That is, the image processing functional section 57 displays the screen in the form of animation such that, in switching display from the multi screen to the entire navigation screen, the boundary between the AV region and the navigation region is slid and the AV region is gradually withdrawn to the left side, in other words, scroll is done so as to gradually decrease the display area of the AV region and scroll is also done so as to gradually increase the display area of the navigation region. Similarly, the image processing functional section 57 displays the screen in the form of animation such that, in switching display from the entire navigation screen to the multi screen, the boundary is slid and the AV region is gradually entered from the left side, in other words, scroll is done so as to gradually increase the display area of the AV region and scroll is also done so as to gradually decrease the display area of the navigation region. The image processing functional section 57 displays the screen in the form of animation such that, in switching display from the multi screen to the entire AV screen, the boundary is slid and the AV region is gradually entered to the right side, in other words, scroll is done so as to gradually increase the display area of the AV region and scroll is also done so as to gradually decrease the display area of the navigation region. Similarly, the image processing functional section 57 displays the screen in the form of animation such that, in switching display from the entire AV screen to the multi screen, the boundary is slid and the AV region is gradually entered from the right side, in other words, scroll is done so as to gradually decrease the display area of the AV region and scroll is also done so as to gradually increase the display area of the navigation region. Thus, the user can feel like the AV screen is inserted and retracted on the navigation screen. Therefore, when viewing the navigation screen, the user depresses the "navigation" button displayed on the right side of the multi screen (D102), thereby easily visually understanding transition to the entire navigation screen (D103). When viewing the AV screen, the user depresses the "AV" button displayed on the left side of the multi screen (D102), thereby easily visually understanding the AV screen being inserted and retracted. FIG. 14 is a conceptual diagram showing an aspect of screen transition of the main screen. As shown in FIG. 14, the user can operate the main screen of the navigation device 1 in the form of an image such that it seems like the left surface is inserted and retracted from the left side on the right surface when viewed from the display window. Therefore, it is possible for the user to easily determine whether the main screen is in the navigation state, the multi state, or the AV state, safely carrying out an operation. The scroll expression processing shown in FIGS. 12 to 14 may be embodied as the invention alone.

In switching display between the multi screen and the entire navigation screen, the position of the boundary between the operation screen for AV and the operation screen for navigation is changed within a range so as not to enter the predetermined first region. Meanwhile, in switching display between the multi screen and the entire AV screen, the position of the boundary between the operation screen for AV and the operation screen for navigation is changed within a range so as to enter the predetermined first region. This is because, while the switching of display between the multi screen and the entire navigation screen refers to the changing of the display range of the touch panel 21 which is occupied by the operation screen for navigation, the switching of display between the multi screen and the entire AV screen refers to the erasing of the display range of the touch panel 21 which is occupied by the operation screen for navigation, and it is not necessary to continue to display the operation buttons related to the navigation function displayed in the predetermined first region.

In switching display between the multi screen and the entire AV screen, the position of the boundary is changed within a range so as not to enter the "normal AV region" including the predetermined second region. Meanwhile, in switching display between the multi screen and the entire navigation screen, the position of the boundary is changed within a range so as to enter the "normal AV region". This is because, while the switching of display between the multi screen and the entire AV screen refers to the changing of the display range of the touch panel 21 which is occupied by the operation screen for AV, the switching of display between the multi screen and the entire navigation screen refers to the erasing of the display range of the touch panel 21 which is occupied by the operation screen for AV, and it is not necessary to continue to display the operation buttons related to the AV function displayed in the predetermined second region.

Figure 37:
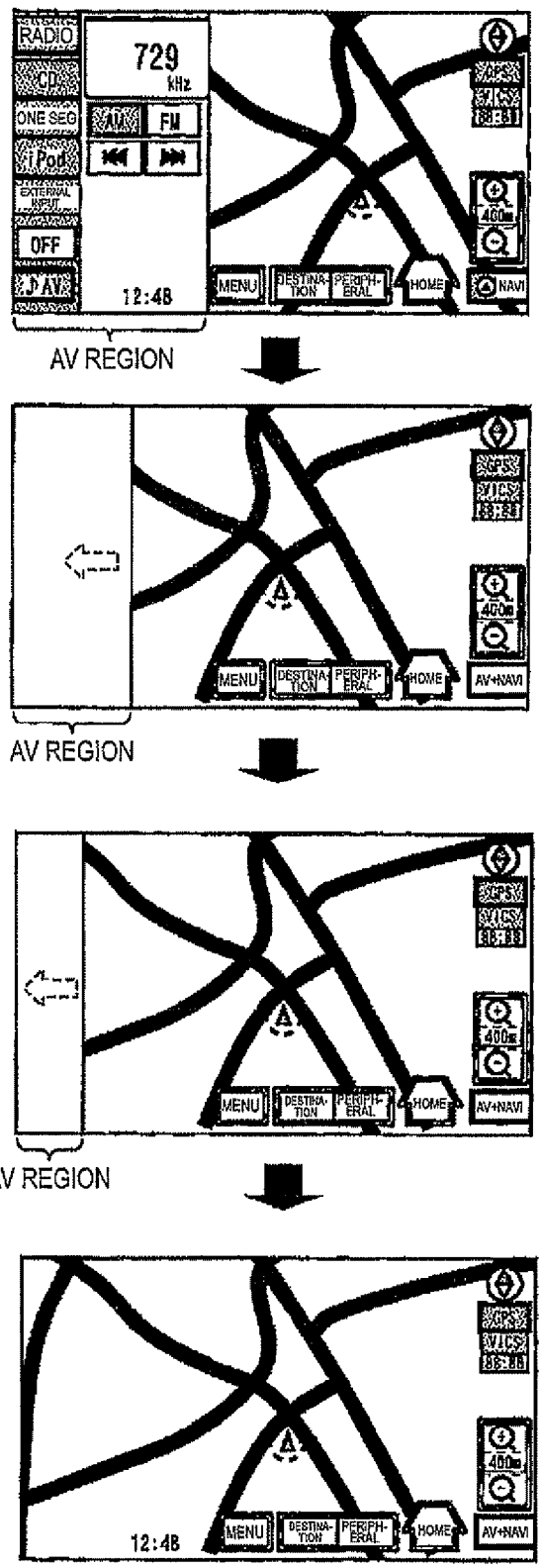
FIG. 37 is a diagram showing a way of hiding an AV region.

In switching display between the multi screen and the entire navigation screen, as the size of the navigation region is changed, the center of the navigation region also moves. Thus, at the time of transition from the multi screen to the entire navigation screen or transition from the entire navigation screen to the multi screen, processing (centering processing) is performed for changing the icon of the position of the host vehicle in accordance with the center of the navigation region. The centering processing may be performed immediately before or after screen transition. That is, the icon of the position of the host vehicle and the map image may be moved in accordance with the center of the navigation region after screen transition is carried out in advance, and then the boundary between the operation screen for AV and the operation screen for navigation may be moved. Alternatively, after the boundary between the operation screen for AV and the operation screen for navigation is initially moved, the icon of the position of the host vehicle and the map image may be moved in accordance with the center of the navigation region. The centering processing may be gradually performed in accordance with an animation image in which the boundary between the navigation region and the AV region is gradually slid. In the example of FIG. 12, after the boundary has been moved, the icon of the position of the host vehicle and the map image are moved in accordance with the center of the navigation region. That is, the centering processing is performed immediately after screen transition. In the example of FIG. 37, before the boundary is moved, the icon of the position of the host vehicle and the map image are moved in accordance with the center of the navigation region. That is, the centering processing is performed immediately before screen transition.

Figure 15:
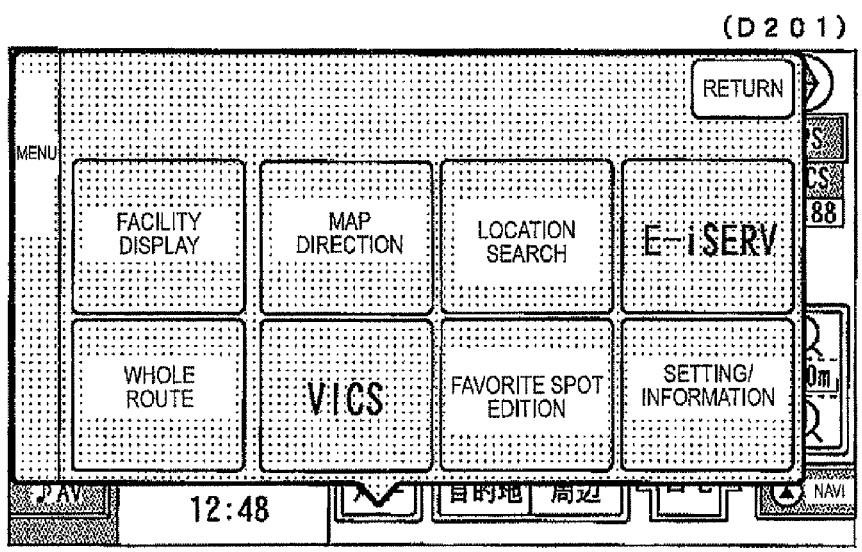
FIG. 15 is a diagram of a menu screen.
Figure 16:
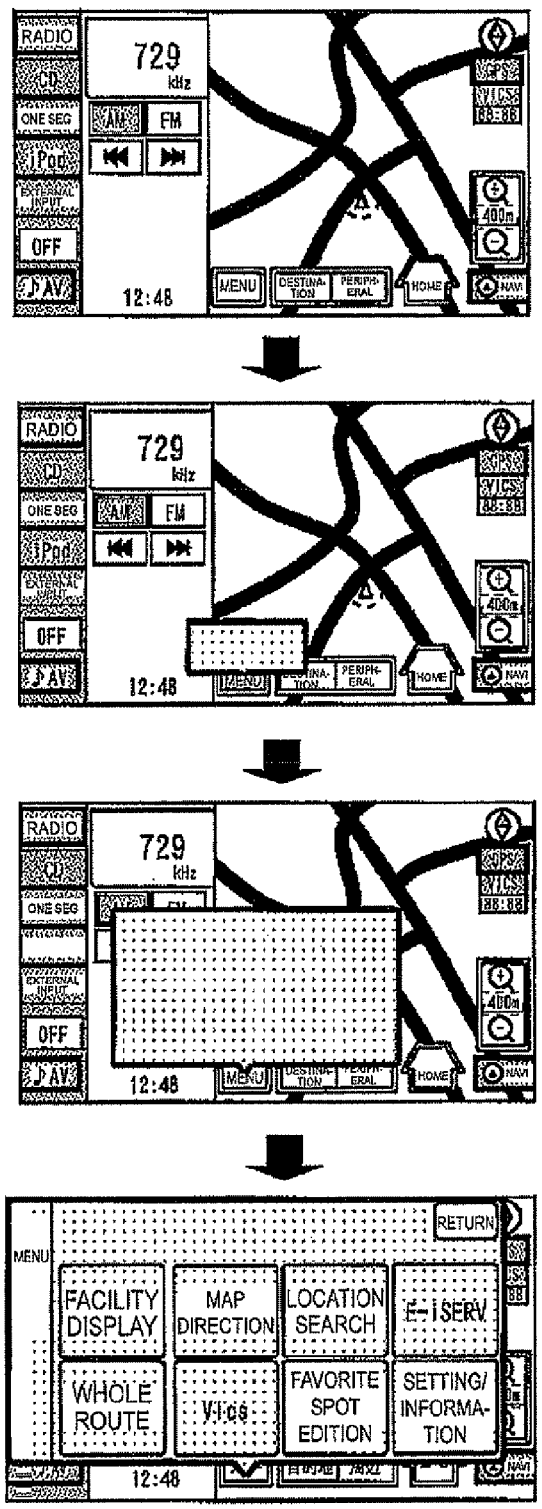
FIG. 16 is a diagram showing an animation at the time of transition from a multi screen to a menu screen.

(D201) Next, a screen related to navigation of the navigation device 1 will be described. First, a menu screen (D201) will be described. If the operation processing functional section 51 detects that the "menu" button displayed in the navigation region of the multi screen (D102) or the entire navigation screen (D103) is depressed, the image processing functional section 57 displays the menu screen (D201) on the touch panel 21. FIG. 15 is a diagram of the menu screen (D201). As shown in FIG. 15, the image processing functional section 57 displays the pop-up of the menu so as to pop up from the "menu" button of the navigation region. The image processing functional section 57 performs animation display such that the pop-up of the menu gradually pops up from the "menu" button and the multi screen (D102) is viewed on the lower side of the pop-up. The pop-op refers to a region which, if a button displayed on the screen is depressed, is displayed so as to pop up from the button, and is, for example, a region where the menu items or the like are displayed. FIG. 16 is a diagram showing animation at the time of transition from the multi screen (D102) to the menu screen (D201). If the "menu" button of the multi screen (D102) is depressed, the pop-up of the menu is displayed so as to pop up from the "menu" button. Thus, the user can easily visually understand that the menu screen is transited from the multi screen and displayed, safely carrying out an operation. In the menu screen (D201), buttons for user setting, such as an icon or facility display, and a button for favorite spot edition are displayed. Spot information or the like registered by the user is stored in the RAM 20C of the control section 20 by the user data processing functional section 55.

Figure 17:
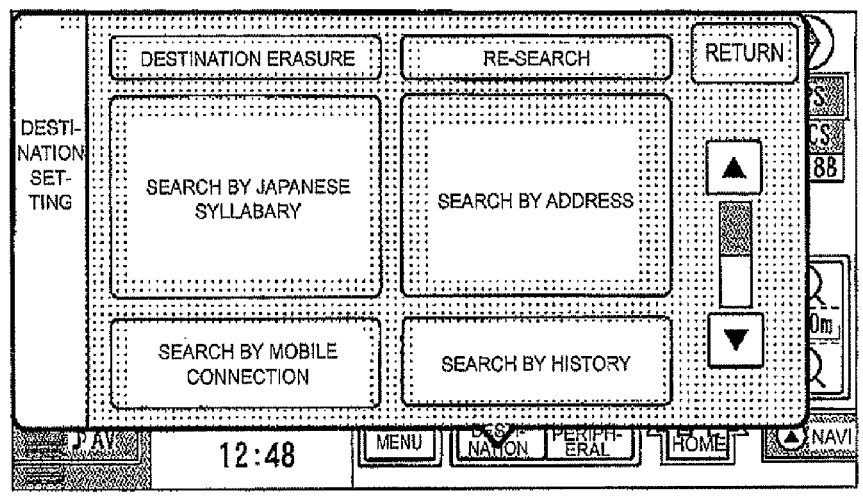
FIG. 17 is a diagram of a destination setting screen.

(D202) Next, a destination setting screen (D202) will be described. If the operation processing functional section 51 detects that the "destination" button displayed in the navigation region of the multi screen (D102) or the entire navigation screen (D103) is depressed, the image processing functional section 57 displays the destination setting screen (D202) on the touch panel 21. That is, as shown in FIG. 17, the image processing functional section 57 displays a pop-up in the form of animation in which buttons for destination setting are arranged so as to pop up from the "destination" button of the navigation region. If the operation processing functional section 51 detects that any button for destination setting is depressed, the image processing functional section 57 displays a corresponding screen. For example, the image processing functional section 57 displays a screen for character input if a "search by Japanese syllabary" button is depressed, displays a screen for selecting a prefecture or the like if a "search by address" button is depressed, displays a screen for requesting the user to bring a mobile phone close to the infrared ray receiving/emitting unit 25 if a "search by mobile connection" button is depressed, and displays destinations which have previously been searched for if a "search by history" button is depressed. Communication data which is provided from the mobile phone by the infrared ray receiving/emitting unit 25 includes positional information, such as the latitude or longitude of a destination, an address, or a telephone number. If a destination is set on a screen which is displayed when the "search by Japanese syllabary", "search by address", "search by mobile connection", or "search by history" button is depressed, the route guidance functional section 53 finds out the shortest route from the position of the host vehicle measured by the positioning functional section 52 to the destination and starts route guidance.

Figure 18:
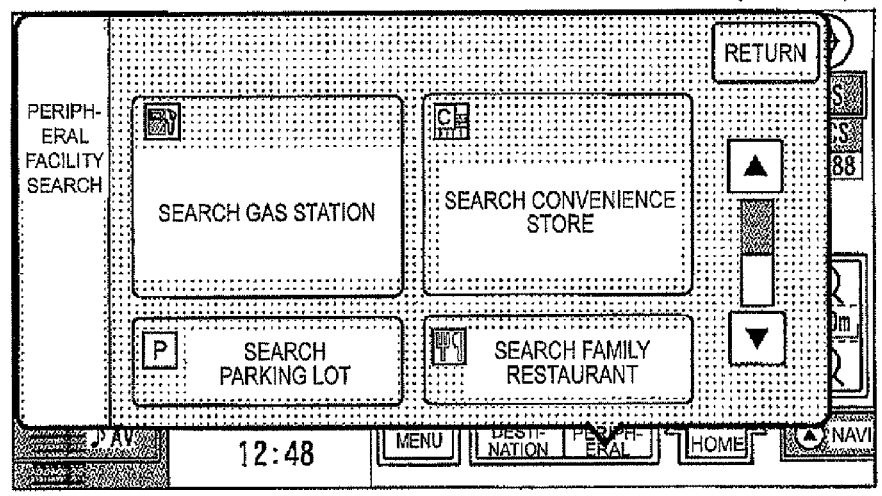
FIG. 18 is a diagram of a peripheral facility search screen.

(D203) Next, a peripheral facility search screen (D203) will be described. If the operation processing functional section 51 detects that the "peripheral" button displayed in the navigation region of the multi screen (D102) or the entire navigation screen (D103) is depressed, the image processing functional section 57 displays the peripheral facility search screen (D203) on the touch panel 21. That is, as shown in FIG. 18, the image processing functional section 57 displays a pop-up in the form of animation in which buttons for peripheral facility search are arranged so as to pop up from the "peripheral" button of the navigation region. Similarly to D203 described above, if any button is depressed, a corresponding screen is displayed. That is, the image processing functional section 57 displays a button for allowing the user to select a category to which a facility as a search target belongs if the "peripheral" button is depressed. If the category of the search target is designated, facilities corresponding to the designated category, such as a gas station or a convenience store, in the periphery of the position of the host vehicle are found and displayed in order from the facility closest to the host vehicle.

Figure 19:
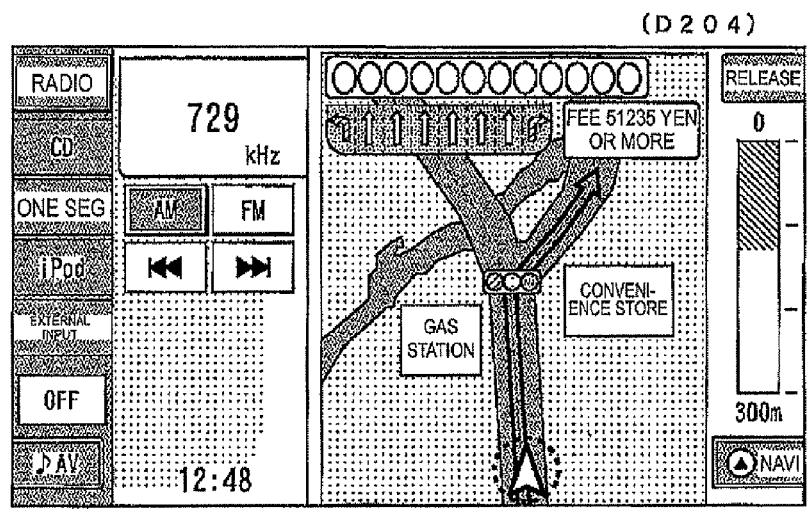
FIG. 19 is a diagram of an intersection enlargement screen.

(D204) Next, an intersection enlargement screen (D204) will be described. When a destination is set on the above-described destination setting screen (D202) or the peripheral search screen (D203) or when the "home" button displayed on the multi screen (D102) or the entire navigation screen (D103) is depressed to set a destination, route guidance by the route guidance functional section 53 starts. The route guidance functional section 53 carries out route guidance on the basis of the position of the host vehicle measured by the positioning functional section 52 and map data read from the card memory by the map data processing functional section 54. The route guidance functional section 53 displays the intersection enlargement screen (D204) after the vehicle draws near an intersection where the vehicle turns right or left and also passes sound data for route guidance to the sound processing functional section 56. FIG. 19 is a diagram of the intersection enlargement screen (D204). As shown in FIG. 19, the enlarged view of an intersection is displayed in the navigation region and a route in which the vehicle will be traveling is indicated by an arrow. At this time, operation buttons for audio/visual are displayed in the AV region.

On the other hand, the operation button (first operation button image) related to the navigation function which is displayed in the predetermined first region defining a portion of the display surface of the touch panel 21 is hidden on the intersection enlargement screen (D204). This is because the display of the intersection enlargement screen (D204) does not refer to the changing of the display range of the touch panel 21 which is occupied by the operation screen for navigation, and it is not necessary that the operation button related to the navigation function is displayed on the screen on which the intersection enlargement screen (D204) is temporarily displayed.

Next, the display mode of the AV screen of the navigation device 1 will be described. As shown in FIG. 8, the AV screen of the navigation device 1 has six screens of a radio mode, a CD mode, a One Seg mode, an iPod mode, an external input mode, and an off mode. If any source selection button or an OFF" button on the left side of the AV region is depressed, the image processing functional section 57 displays an AV operation screen of a corresponding mode. For example, if a "radio" button is depressed, the image processing functional section 57 displays a radio frequency or selection button shown in FIG. 9. The same is applied to a CD or iPod button. If an "One Seg" button or an "external input" button is depressed, the image processing functional section 57 displays a selection button or the like in the AV region and also switches display of the navigation region to an image from the broadcast wave receiving section 7 or an image of the external sound/image input section 8. Meanwhile, if the brake detection section 4 detects the release of a parking brake signal, the image processing functional section 57 stops image display from the broadcast wave receiving section 7 or the external sound/image input section 8. Hereinafter, the display mode of the AV screen will be described in detail.

Figure 20:
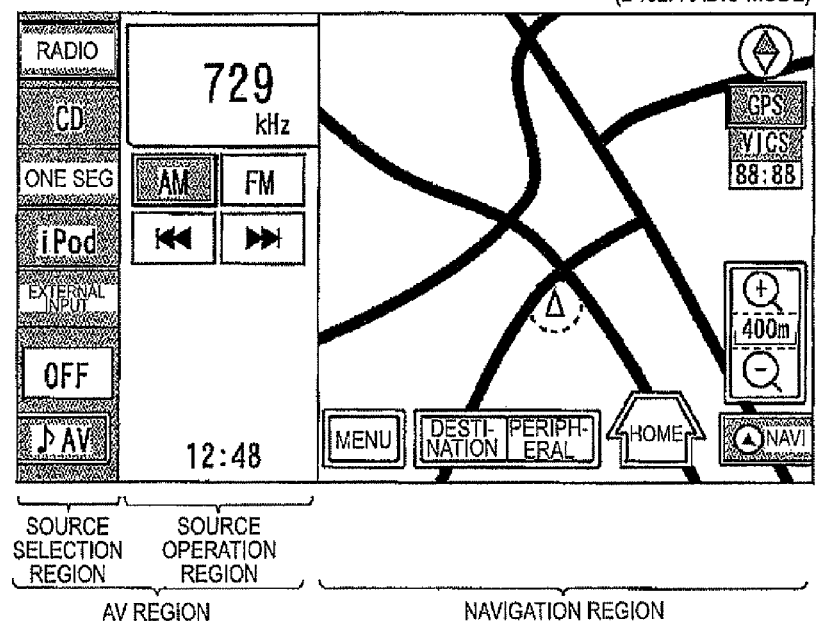
FIG. 20 shows an AV screen (radio).

(Radio Mode) FIG. 20 is a diagram showing a display screen when radio is selected. As shown in FIG. 20, the AV region is divided into a source selection region where buttons for switching a source are arranged and a source operation region where a selected source is operated. The source selection buttons displayed in the source selection region are constantly displayed on the touch panel 21 with the multi screen (D102) and the entire AV screen (D104), regardless of which source is selected. If "radio" is depressed from among the source selection buttons, the image processing functional section 57 generates an image such that it seems like the "radio" button pops up with a color different from other buttons. In the source operation region, information specific to a selected source, such as the frequency of received electric waves, is displayed, in addition to the operation buttons, such as the AM/FM switching button and the selection button. Similarly to the source selection buttons, the AM/FM switching button is displayed such that it seems like a button being selected pops up with a color different from other buttons.

If a user's touch operation of the "radio" button is detected, the operation processing functional section 51 controls the broadcast wave receiving section 7 and the amplifier 12 to put in an operation state and operates the sound processing functional section 56 such that a sound signal is sent from the broadcast wave receiving section 7 to the amplifier 12. The source operation region may be displayed as a pop-up so as to pop up from an operation button of the source selection region. Accordingly, it is easier to recognize a source to which an operation button displayed in the source operation region is related.

Figure 21:
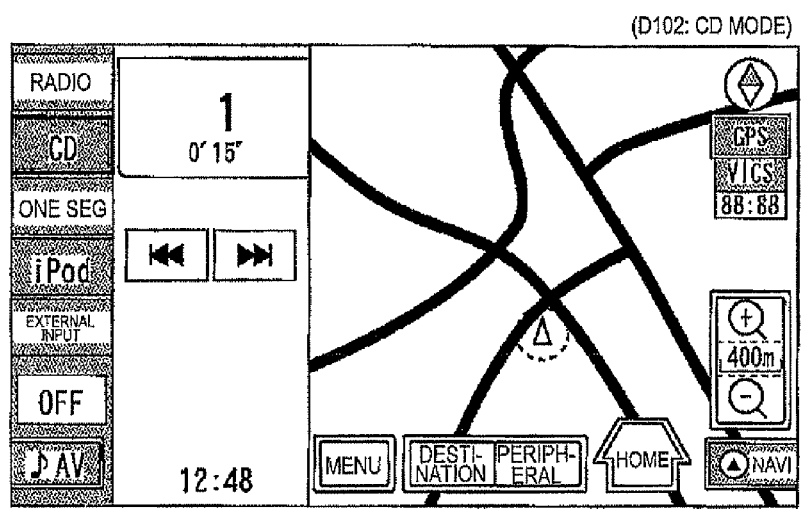
FIG. 21 shows an AV screen (CD).

(CD Mode) FIG. 21 is a diagram showing a display screen when CD is selected. If "CD" is depressed from among the source selection buttons, as shown in FIG. 21, the image processing functional section 57 generates an image such that it seems like the "CD" button pops up with a color different from other buttons. In the source operation region, information specific to a selected source, such as the track number or reproduction time of a music piece being reproduced, is displayed, in addition to operation buttons, such as a selection button. operation If a touch operation of the "CD" button is detected, the operation processing functional section 51 controls the CD drive 16 and the amplifier 12 to put in an operation state and operates the sound processing functional section 56 such that a sound signal reproduced by the CD drive 16 is sent to the amplifier 12.

Figure 22:
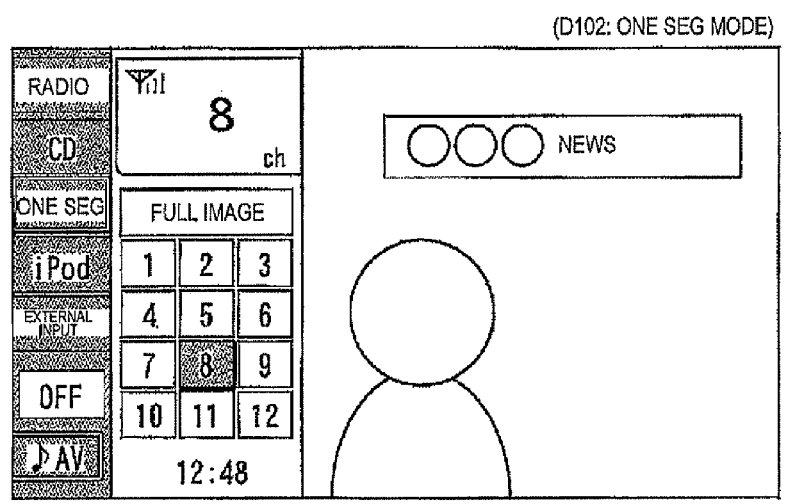
FIG. 22 shows an AV screen (One Seg).

(One Seg Mode) FIG. 22 is a diagram showing a display screen when One Seg is selected. If "One Seg" is depressed from among the source selection buttons, as shown in FIG. 22, the image processing functional section 57 generates an image such that it seems like the "One Seg" button pops up with a color different from other buttons. With regard to a selected button, similarly to the "One Seg" button, the button is displayed so as to pop up. In the source operation region, information specific to a selected source, such as the channel of a frequency being received or intensity of received electric waves, is displayed, in addition to operation buttons, such as a selection button. When the One Seg mode is selected, the image processing functional section 57 displays a screen of television broadcast in the navigation region. If a touch operation of the "One Seg" button is detected, the operation processing functional section 51 controls the broadcast wave receiving section 7 or the amplifier 12, the display processing section 22, the sound processing functional section 56, and the image processing functional section 57 such that image display on the touch panel 21 or sound output by the amplifier 12 is carried out.

Figure 23:
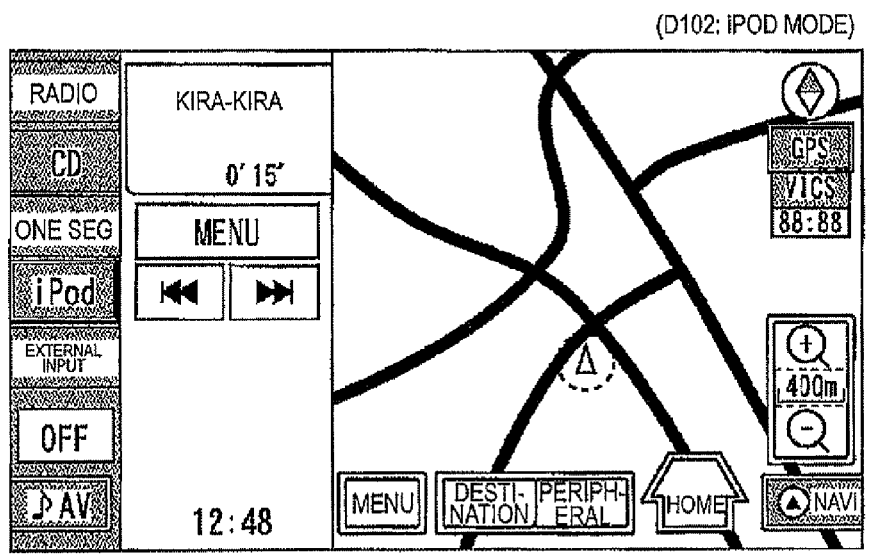
FIG. 23 shows an AV screen (iPod).

(iPod Mode) FIG. 23 is a diagram showing a display screen when iPod is selected. If "iPod" is depressed from among the source selection buttons, as shown in FIG. 23, the image processing functional section 57 generates an image such that it seems like the "iPod" button pops up with a color different from other buttons. In the source operation region, information specific to a source, such as the title or reproduction time of a music piece being reproduced, is displayed, in addition to operation buttons, such as a selection button and a menu button. If a touch operation of the "iPod" button is detected, the operation processing functional section 51 performs communication with an external portable music player through the portable player interface 6 and operates the sound processing functional section 56 such that an acquired sound signal is sent to the amplifier 12.

Figure 24:
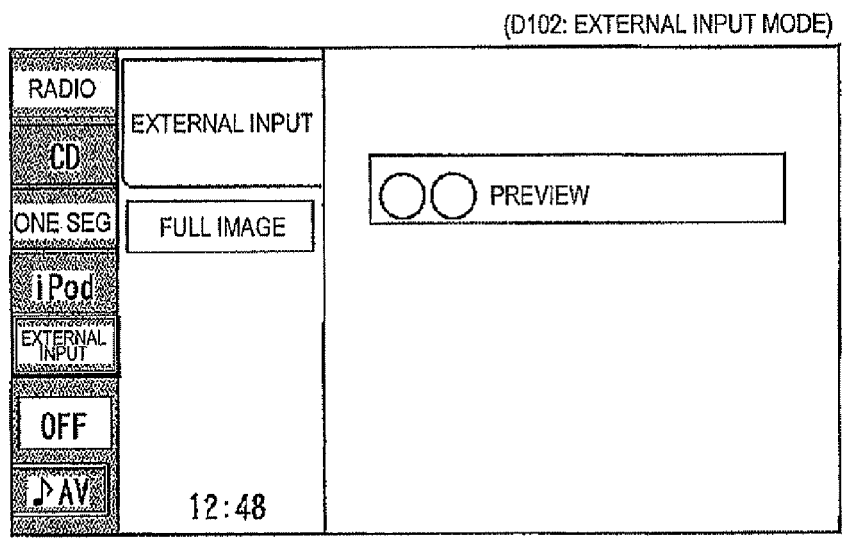
FIG. 24 shows an AV screen (external input).

(External Input Mode) FIG. 24 is a diagram showing a display screen when external input is selected. If "external input" is depressed from among the source selection buttons, as shown in FIG. 24, the image processing functional section 57 generates an image such that it seems like the "external input" button pops up with a color different from other buttons. In the source operation region, an indication that there is an external input is displayed as information specific to a source, in addition to operation buttons, such as a full image button which is depressed in displaying an external input image over the entire screen. When external input is selected, the image processing functional section 57 displays a screen of an external input image in the navigation region. If a touch operation of the "external input" button is detected, the operation processing functional section 51 controls the amplifier 12, the display processing functional section 22, the sound processing functional section 56, and the image processing functional section 57 such that an image signal and a sound signal from the external sound/image input section 8 are displayed or output.

Figure 25:
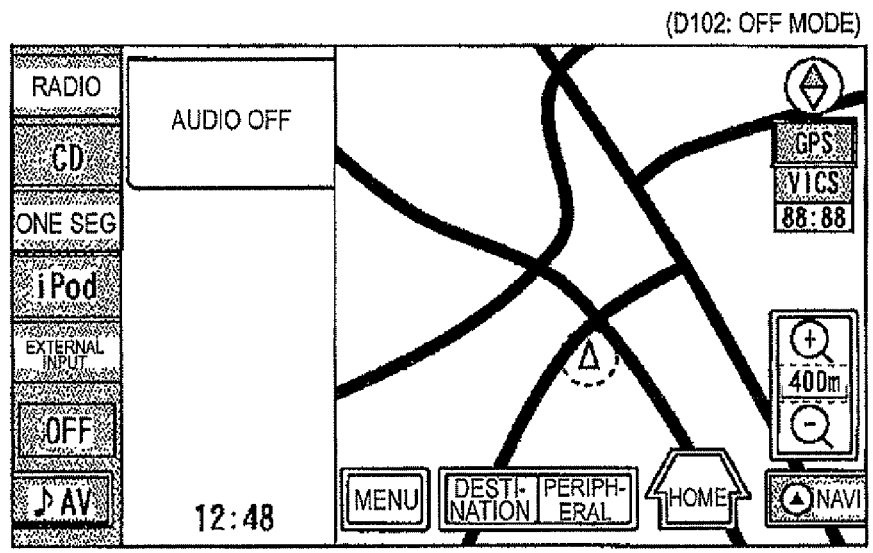
FIG. 25 shows an AV screen (OFF).

(Off Mode) FIG. 25 is a diagram showing a display screen when external input is selected. If "OFF" is depressed from among the source selection buttons, as shown in FIG. 25, the image processing functional section 57 generates an image such that it seems like the "OFF" button pops up with a color different from other buttons. In the source operation region, an indication that audio is off is displayed. If a touch operation of the "OFF" button is detected, the operation processing functional section 51 stops equipment, such as the amplifier 12 or the broadcast wave receiving section 7, which is operating before the touch operation. As described above, in displaying the source operation region so as to pop up from the source selection button, in the off mode, the source operation region may be hidden from the screen. In other words, in the off mode, animation display may be performed such that the pop up is retracted to the source selection region.

The operation of the navigation device 1 has been described above. In the navigation device 1 of this embodiment, in order to increase operational performance of both the AV function and the navigation function, the display region of the screen is divided into two regions for the AV function and the navigation function. Even when the range of each region within the screen is changed (that is, even when the boundary is moved and the size of the AV region where the operation screen for AV is displayed and the size of the navigation region where the operation screen for navigation is displayed are enlarged or reduced), the operation buttons for operating AV and navigation are displayed at the same positions on the screen, making it easy to carry out screen operation on the touch panel 21. In the navigation device 1 of this embodiment, in order to increase operational performance of both AV and navigation, the operation screen for AV and the operation screen for navigation are displayed in parallel while being separated by the movable boundary. Before and after the position of the boundary between the screens is changed, the operation button related to the navigation function is displayed at the same position and of the same size on the screen, making it possible to change the position of the boundary between the screens without degrading operational performance of the operation button displayed on the touch panel 21. In the navigation device 1 of this embodiment, when the boundary between the AV region and the navigation region is moved, an animation image is generated in which the boundary is gradually slid. For this reason, it becomes possible to easily recognize the correspondence relation between the screen related to the navigation function and the screen related to the AV function through slide display.

<Modification 1>

Figure 26:
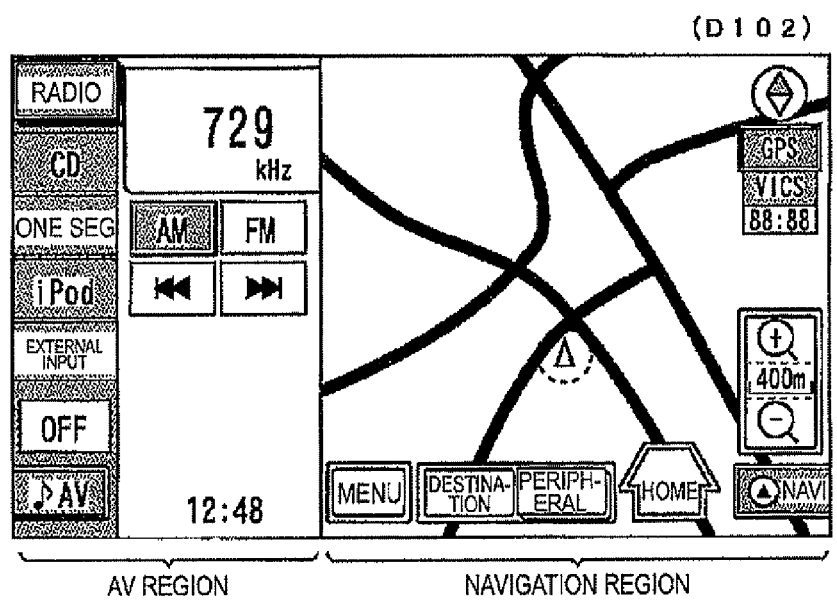
FIG. 26 is a diagram of a multi screen according to a modification.
Figure 27:
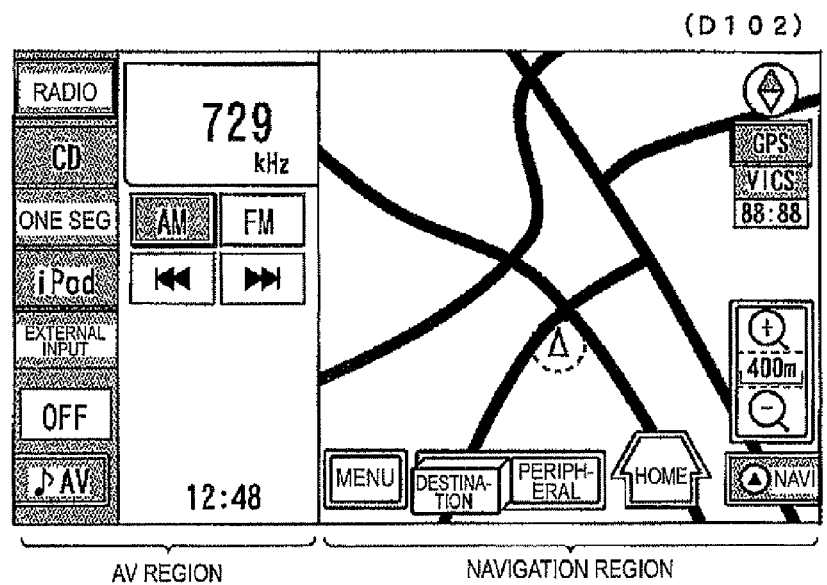
FIG. 27 is a diagram of a multi screen according to a modification.
Figure 28:
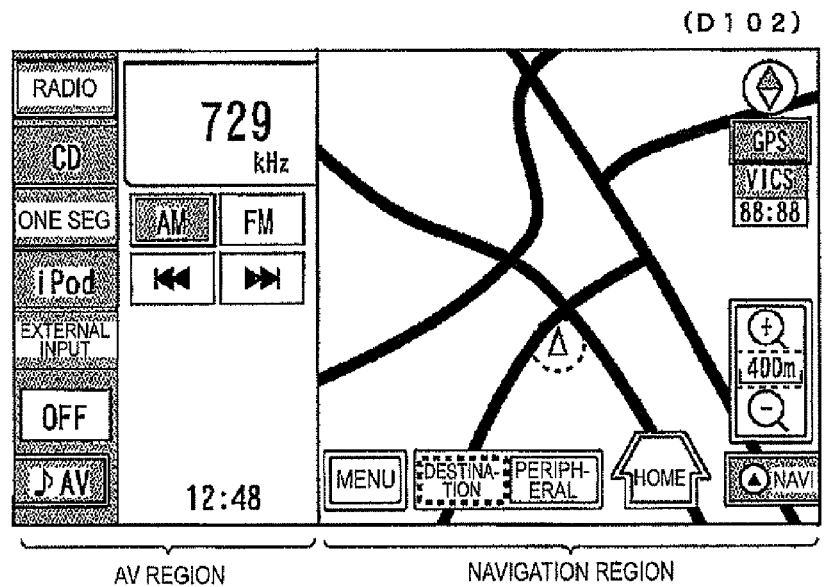
FIG. 28 is a diagram of a multi screen according to a modification.

The navigation device 1 may be modified as follows. FIGS. 26, 27, and 28 are diagrams showing a display example of a multi screen according to this modification. In this modification, the operation buttons which are displayed on the touch panel 21 are highlighted according to the operation history. In the navigation device 1 of this modification, with regard to a button which is frequently operated, for example, like the "radio" button or the "peripheral" button of FIG. 26, a button is shaded, or like the "destination" button of FIG. 27, a button is three-dimensionally displayed. In addition, like the "destination" button of FIG. 28, a frame (button frame) is displayed in a broken line, blinking, or displayed in a moving broken line. Hereinafter, processing which is executed by the navigation device 1 of this modification will be described. The following processing content shows a modification of a portion of drawing processing which is executed each time each screen described above is displayed. That is, the apparatus configuration or processing flow other than the following content is the same as in the above-described embodiment, thus description thereof will be omitted.

Processing Example 1

FIG. 29 is a diagram showing a processing flow of graphic processing which is executed by the navigation device 1 of this modification when a button which is operated equal to or greater than a given number of times is highlighted. In performing graphic display, as shown in FIG. 29, the image processing functional section 57 first references a table (S101). The table is stored in the RAM 20C of the control section 20 and, as shown in FIG. 30, includes the history of the number of operations of each button. The table is managed by the operation processing functional section 51, and the number of operations is incremented by 1 each time a corresponding operation button is depressed. In displaying each screen, such as the multi screen, the image processing functional section 57 references the table and determines whether or not the number of operations is equal to or greater than a predetermined number of times for each operation button (S102). In the case of a button with the number of operations smaller than a predetermined number of times, like the "CD" button of FIG. 26, normal drawing processing is performed (S103). Meanwhile, in the case of a button with the number of operations equal to or greater than a predetermined number of times, drawing processing is carried out to draw a button in a special form, such as the "peripheral" button or the "radio" button of FIG. 26, the "destination" button of FIG. 27, and the "destination" button of FIG. 28. Graphic data of an operation button in a special form is stored in the ROM 2013 in advance.

If the graphic processing is performed in such a manner, a button which has been operated equal to or greater than a given number of times is highlighted. Therefore, it becomes possible for the user to easily visually discriminate and simply recognize a button which is frequently used.

Processing Example 2

Figure 31:
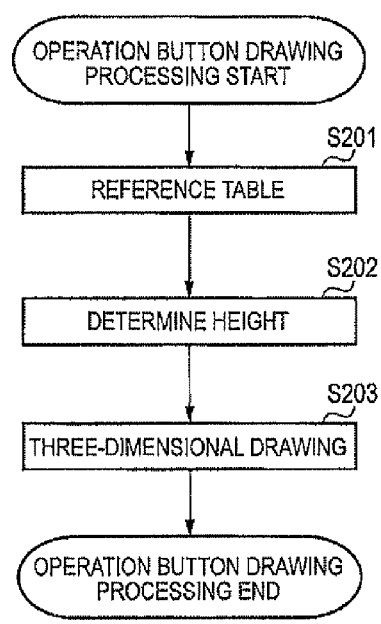
FIG. 31 is a diagram of a processing flow of graphic processing of a navigation device according to a modification.

FIG. 31 is a diagram of a processing flow of graphic processing which is executed by the navigation device 1 of this modification when highlighting is carried out in accordance with the number of operations. In performing graphic display, as shown in FIG. 31, the image processing functional section 57 first references a table (S201). This table is the same as shown in FIG. 30 and is managed by the operation processing functional section 51. The image processing functional section 57 determines the height of a button to be three-dimensionally displayed from the number of operations in the table (S202). The height of a button to be three-dimensionally displayed is linearly determined in accordance with the history of the number of operations in the table. The image processing functional section 57 performs drawing processing for each button in accordance with the number of operations such that the button looks so high (S203). At this time, for example, like the "destination" button of FIG. 27, three-dimensional display is performed.

If the graphic processing is performed in such a manner, a button is highlighted in accordance with the operation frequency. Therefore, it becomes possible for the user to easily visually discriminate and simply recognize a button which is frequently used.

Processing Example 3

Figure 32:
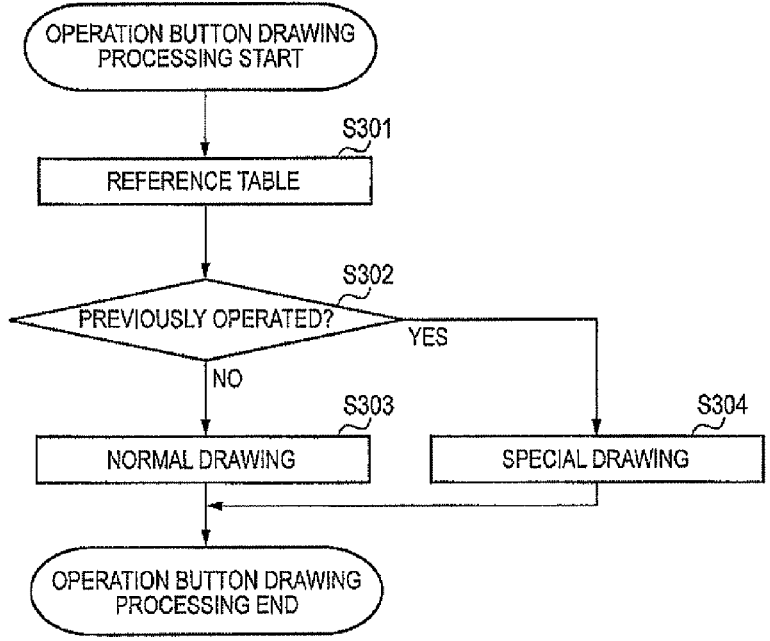
FIG. 32 is a diagram of a processing flow of graphic processing of a navigation device according to a modification.
Figures 33, 34:
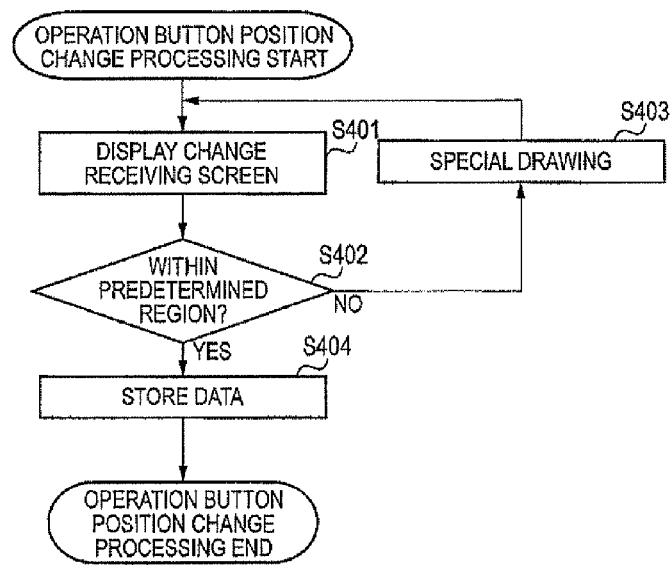
FIG. 33 shows a table in a navigation device according to a modification.
FIG. 34 is a diagram of a flow of processing for changing the display position of an operation button.

FIG. 32 is a diagram of a processing flow of graphic processing which is executed by the navigation device 1 of this modification when a button which has previously been operated is highlighted. In performing graphic display, as shown in FIG. 32, the image processing functional section 57 first references a table (S301). As shown in FIG. 33, this table shows the flag for each button which represents whether or not the button has previously been operated at the time of a previous operation of the navigation device 1, and is managed by the operation processing functional section 51. When a user's operation is received, the operation processing functional section 51 clears (deactivates) the flag of each operation button and also turns on (activates) the flag of a button which is operated by the user. The image processing functional section 57 references the table in displaying each screen, such as the multi screen, and determines whether or not each button has previously been operated (S302). If there is no button which has previously been operated, normal drawing processing, such as the "CD" button of FIG. 26, is performed (S303). Meanwhile, if there is a button which has previously been operated, drawing processing is carried out to draw a button in a special form, such as the "peripheral" button or the "radio" button of FIG. 26, the "destination" button of FIG. 27, and the "destination" button of FIG. 28.

If the graphic processing is performed in such a manner, a button which has previously been operated is highlighted, making it possible to easily recognize the button rather than other buttons. Although in the foregoing embodiment, an in-vehicle type has been described, the invention may be applied to any device insofar as the device can be used as an in-vehicle type. For example, the invention may also be applied to a portable navigation function-equipped electronic apparatus.

<Modification 2>

The navigation device 1 may be modified as follows. FIG. 34 is a diagram showing a flow of processing for changing the display position of an operation button which is executed by the navigation device 1 of this modification. The navigation device 1 of this modification can change the display position of the operation button (first operation button image) related to the navigation function. The apparatus configuration or processing flow other than the following content is the same as in the above-described embodiment, thus detailed description will be omitted.

Figure 35:
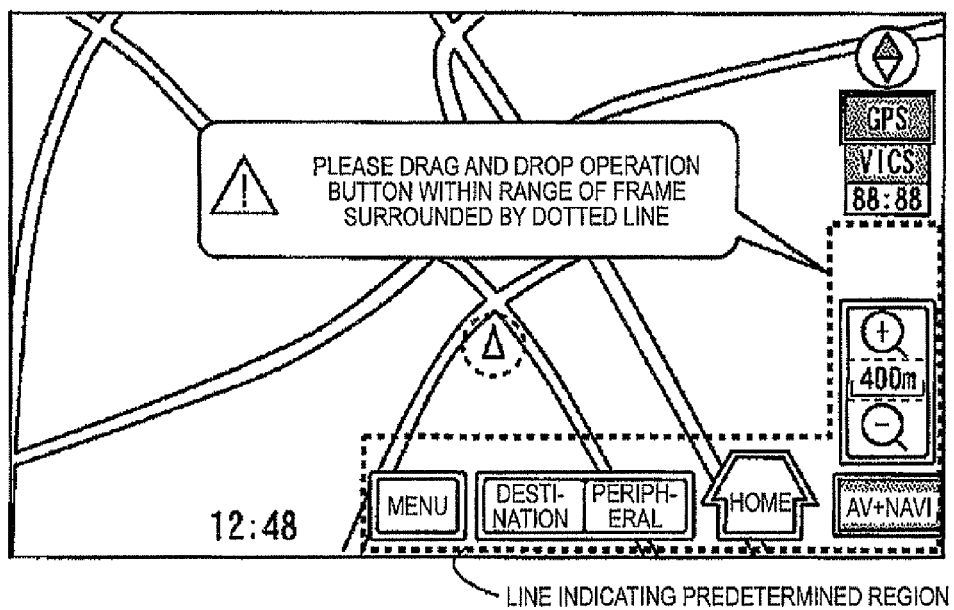
FIG. 35 is a diagram of a screen which is displayed when changing the display position of an operation button is received.

In performing the processing for changing the display position of an operation button, as shown in FIG. 34, first, a change receiving screen is displayed (S401). This screen is based on graphic data which is stored in the ROM 20B of the control section 20. In this case, as shown in FIG. 35, a message which requests a drag-and-drop operation of an operation button and a frame border which represents a range for arranging the operation button are superimposingly displayed on the navigation screen. The change receiving screen is the screen which is called from a "setting" button displayed on the menu screen (D201) and is displayed by the image processing functional section 57. The frame border on the change receiving screen represents the above-described predetermined region and also represents the range for arranging an operation button which can be arbitrarily arranged by the user. In this modification, in order that an operation button is arranged at a free position, a range which is slightly greater than the range of the display screen defined by the predetermined region in the foregoing embodiment is defined as a predetermined region. The operation processing functional section 51 determines whether or not the position of an operation button dropped by the user is within the range of the predetermined region on the change receiving screen (S402). If the position of an operation button dropped by the user is outside the range of the predetermined region, the operation processing functional section 51 causes the image processing functional section 57 to display an alert screen which requests the user to drop the operation button within the range of the frame border (S403). Meanwhile, if the position of an operation button dropped by the user is within the range of the predetermined region, the operation processing functional section 51 causes the user data processing functional section 55 to perform processing for writing data of the display position of the operation button into the RAM 20C (S404). The image processing functional section 57 generates the image of the multi screen D102 or the entire navigation screen D103 on the basis of display position data of the operation button written into the RAM 20C. The operation processing functional section 51 when this processing flow is executed serves as a change request receiving section.

When the display position of an operation button related to the navigation function can be arbitrarily changed, a settable display position is restricted within the range of a predetermined region. Therefore, even when the user arbitrarily changes the arrangement of operation buttons, it becomes possible to change the position of the boundary between the screens without degrading operational performance of operation buttons displayed on the touch panel 21.

Although in the above-described embodiment or modification, the graphic screen for navigation has been arranged on the right side and the graphic screen for AV has been arranged on the left side, both screens may be arranged vice versa. That is, the graphic screen for navigation may be arranged on the left side and the graphic screen for AV may be arranged on the right side. In this case, it is assumed that the predetermined region divides the lower portion or the left portion of the display surface of the touch panel from another portion.

<Modification 3>

Figure 36:
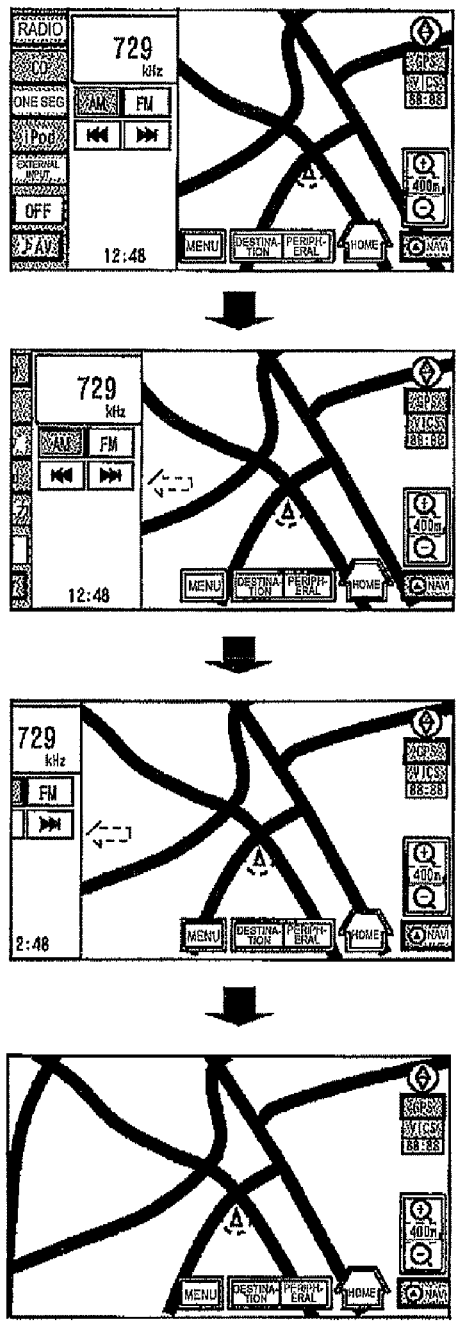
FIG. 36 is a diagram showing a screen changes according to a modification.

The navigation device 1 may be modified as follows. FIG. 36 is a diagram showing screen changes which appear in the navigation device 1 of this modification. In the above-described embodiment, as shown in FIG. 12, the boundary between the AV region and the navigation region is slid, such that it seems like the screen of the AV region or the navigation region moves. In contrast, in this modification, the screen displayed in the AV region and the screen displayed in the navigation region are slid.

In switching display from the multi screen to the entire navigation screen, as shown in FIG. 36, the image processing functional section 57 performs animation display such that it seems like the navigation region or the AV region is slid. That is, in switching display from the multi screen to the entire navigation screen, the image processing functional section 57 displays the screen in the form of animation such that the screen of the AV region and the screen of the navigation region as well as the boundary between the AV region and the navigation region are slid and the AV region is gradually withdrawn to the left side. The navigation region is slid while centering such that the position of the host vehicle is located at the center of the navigation region. Similarly, in switching display from the entire navigation screen to the multi screen, the screen of the AV region and the screen of the navigation region are slid along with the boundary, and the screen is displayed in the form of animation such that the AV region is gradually entered from the left side. At this time, in the navigation region, centering processing is performed such that the position of the host vehicle is located at the center of the navigation region. In the example of FIG. 36, the centering processing is gradually performed in accordance with the animation image in which the boundary between the navigation region and the AV region is gradually slid. Therefore, it becomes possible for the user to feel like the AV screen is inserted and retracted on the navigation screen and to easily recognize the correspondence relation of the screens. Similarly, at the time of switching from the entire navigation screen to the multi screen, slide display is performed.

Although in the above-described embodiment, the AV region has been arranged on the left side of the multi screen and the navigation region has been arranged on the right side, the AV region may be arranged on the right side of the multi screen and the navigation region may be arranged on the left side. Preferably, the navigation region is arranged on the driver's seat side of a vehicle in which the navigation device is mounted and the AV region is arranged on the front passenger's seat side.

Although in the above-described embodiment, the invention has been applied to an in-vehicle navigation device, the invention is not limited thereto. For example, the invention may be applied to a portable navigation device or a portable electronic apparatus having a navigation function, such as a mobile phone.

Although in the above-described embodiment, the invention has been applied to a navigation device serving as an information processing device capable of processing navigation information, the invention is not limited thereto. For example, the invention may be applied to an image processing device which is externally connected to or embedded in a navigation device having a touch panel or a portable electronic apparatus to generate a navigation image.

This application is based on Japanese Patent Application No. 2008-234527 filed on Sep. 12, 2008, Japanese Patent Application No. 2008-234598 filed on Sep. 12, 2008, and Japanese Patent Application No. 2008-235298 filed on Sep. 12, 2008, the contents of which are incorporated herein by reference.

REFERENCE SIGNS LIST

1: navigation device
2: main unit
3: display unit
51: operation processing functional section
52: positioning functional section
53: route guidance functional section
54: map data processing functional section
55: user data processing functional section
56: sound processing functional section
57: image processing functional section

The invention claimed is:

1. An information processing device capable of processing navigation information, the information processing device comprising:
   a touch panel capable of displaying images and receiving a touch operation; and
   an image generation section configured to generate a navigation image including a map image and a plurality of operation button images for receiving the touch operation, the images being displayed on the touch panel, wherein:
   the operation button images include a first operation button image related to a navigation function and a second operation button image related to a plurality of functions other than the navigation function,
   the image generation section generates a first image which is obtained by combining the navigation image and the first operation button image and a second image which includes the second operation button image,
   the first image and the second image are respectively displayed in a first display region and a second display region,
   the first display region and the second display region are separated by a movable boundary,
   a size of the first display region and a size of the second display region are enlargeable and shrinkable, the second operation button image is configured to disappear from the second image when the size of the second display region is reduced, and in the touch panel, a position of the first operation button image before the size of the first display region is enlarged is the same as a position of the first operation button image after the size of the first display region is enlarged.

2. The information processing device according to claim 1, wherein the second image includes a function selection region where a plurality of function selection button images each for selecting a corresponding one of the plurality of functions are displayed, and a function operation region where a plurality of functional operation button images each for operating a function selected by the corresponding function selection button image are displayed.

3. The information processing device according to claim 1, wherein a size of the second display region is enlargeable,
wherein in the touch panel, a position of the second operation button image before the size of the second display region is enlarged is the same as a position of the second operation button image after the size of the second display region is enlarged,
wherein the second operation button image is related to a basic operation of one of the plurality of functions, and
wherein when the size of the second display region is enlarged, an extended operation button image related to an extensive operation of the one of the plurality of functions is displayed in the enlarged second display region.

4. The information processing device according to claim 1, wherein the first display region is arranged on one side of left and right sides of the touch panel, and the second display region is arranged on the other side of the left and right sides of the touch panel, and
wherein the first display region is arranged on a side of a driver's seat of a vehicle in which the information processing device is mounted.

5. The information processing device according to claim 1, wherein the movable boundary is moved to reduce the first display region and to enlarge the second display region, or to reduce the second display region and to enlarge the first display region.

6. The information processing device according to claim 1, further comprising:
a receiving section that receives positional data of the information processing device; and
a storage section that stores map data,
wherein the navigation function generates graphic data for drawing the navigation image on the basis of the positional data and the map data,
the image generation section generates the navigation image on the basis of the graphic data, and
the first operation button image includes at least one of a button image for displaying a screen for setting the navigation function, a button image for displaying a screen for setting a destination of a vehicle, and a button image for enlarging and reducing the map image.

7. The information processing device according to claim 1, wherein the plurality of functions include an audio function of outputting sound through a speaker, and
the second operation button image includes at least one of a music selection button image and a radio broadcast selection button image.

8. The information processing device according to claim 1, wherein the image generation section generates the images to be displayed on the touch panel such that the second operation button image is highlighted in accordance with a history of the touch operation.

9. The information processing device according to claim 1, wherein the image generation section moves the boundary to enlarge the first display region and generates an image in which only the first image is displayed on the touch panel.

10. The information processing device according to claim 9, wherein, when the image in which only the first image is displayed on the touch panel is generated, the image generation section moves the boundary to reduce the first display region and generates an image in which the first image and the second image are displayed on the touch panel.

11. The information processing device according to claim 1, wherein the image generation section moves the boundary to enlarge the second display region and generates an image in which only the second image is displayed on the touch panel.

12. The information processing device according to claim 11, wherein, when the image in which only the second image is displayed on the touch panel is generated, the image generation section moves the boundary to reduce the second display region and generates an image in which the first image and the second image are displayed on the touch panel.

13. The information processing device according to claim 9, wherein the image generation section generates an animation image in which the boundary is gradually slid when moving the boundary.

14. The information processing device according to claim 9,
wherein the image generation section generates an animation image in which the boundary is gradually slid when moving the boundary, and
the image generation section generates the animation image such that, in the navigation image, a position of the information processing device is located at the center of the first display region while the boundary is gradually slid.

15. An image processing device capable of generating images which are displayed on a touch panel capable of receiving a touch operation, the image processing device comprising:
a central processing unit configured as a control section to act as an image generation section that generates a navigation image including a map image and a plurality of operation button images for receiving the touch operation, the images being displayed on the touch panel, wherein:
the operation button images include a first operation button image related to a navigation function and a second operation button image related to a plurality of functions other than the navigation function,
the image generation section generates a first image which is obtained by combining the navigation image and the first operation button image and a second image which includes the second operation button image,
the first image and the second image are respectively displayed in a first display region and a second display region,
the first display region and the second display region are separated by a movable boundary,
a size of the first display region and a size of the second display region are enlargeable and shrinkable,
the second operation button image is configured to disappear from the second image when the size of the second display region is reduced, and in the touch panel, a position of the first operation button image before the size of the first display region is enlarged is the same as a position of the first operation button image after the size of the first display region is enlarged.

16. The information processing device according to claim 11, wherein the image generation section generates an animation image in which the boundary is gradually slid when moving the boundary.

17. The information processing device according to claim 1, wherein the first display region has a center, and the center moves when the size of the first display region is changed.

18. The information processing device according to claim 1, wherein a center of the map image moves with a center of the first display region before, after, or while the size of the first display region is changed.

19. The information processing device according to claim 1, wherein when the first display region is enlarged, the map image retains a same scale but more of the map image is displayed in the first display region.

* * * * *